United States Patent
Matsui

(10) Patent No.: US 9,062,892 B2
(45) Date of Patent: Jun. 23, 2015

(54) VENTILATION SYSTEM

(75) Inventor: Nobuki Matsui, Osaka (JP)

(73) Assignee: DAIKIN INDUSTRIES, LTD., Osaka-Shi (JP)

(*) Notice: Subject to any disclaimer, the term of this patent is extended or adjusted under 35 U.S.C. 154(b) by 404 days.

(21) Appl. No.: 13/382,590

(22) PCT Filed: Jul. 6, 2010

(86) PCT No.: PCT/JP2010/004418
§ 371 (c)(1), (2), (4) Date: Jan. 6, 2012

(87) PCT Pub. No.: WO2011/004590
PCT Pub. Date: Jan. 13, 2011

(65) Prior Publication Data
US 2012/0122388 A1 May 17, 2012

(30) Foreign Application Priority Data
Jul. 8, 2009 (JP) .................... 2009-161890

(51) Int. Cl.
*F24F 7/007* (2006.01)
*F24F 11/04* (2006.01)
*F24F 7/08* (2006.01)
*F24F 12/00* (2006.01)

(52) U.S. Cl.
CPC . *F24F 11/04* (2013.01); *F24F 7/08* (2013.01); *F24F 12/006* (2013.01); *F24F 2012/007* (2013.01); *Y02B 30/563* (2013.01)

(58) Field of Classification Search
CPC ......... F24F 1/00; F24F 2001/007; F24F 3/06; F24F 7/06; F24F 2007/001; F24F 7/04; F24F 7/08; F24F 7/10; F24F 11/0001; F24F 11/0009; F24F 2011/0046; F24F 2011/0052; E04F 17/04
USPC ......... 454/251, 228, 229, 232, 233, 235, 236, 454/237, 239, 241, 244, 245, 249, 252
See application file for complete search history.

(56) References Cited

U.S. PATENT DOCUMENTS

| 3,789,621 A * | 2/1974 | Inuzuka ................... 62/324.1 |
| 2006/0199520 A1 | 9/2006 | Chung et al. |
| 2006/0254749 A1* | 11/2006 | Kim et al. ................. 165/47 |

(Continued)

FOREIGN PATENT DOCUMENTS

| CN | 1821668 A | 8/2006 |
| JP | 6-235534 A | 8/1994 |

(Continued)

*Primary Examiner* — Gregory Huson
*Assistant Examiner* — Dana Tighe
(74) *Attorney, Agent, or Firm* — Birch, Stewart, Kolasch & Birch, LLP

(57) ABSTRACT

A ventilation system (S) includes: a first ventilation device (10a) and a second ventilation device (10b) each including an air supply fan (26) and an exhaust fan (25); a booster fan (1) placed upstream in supply air of the air supply fan (26) of each of the ventilation devices (10a, 10b); and a controller (100) configured to control actuation of the ventilation devices (10a, 10b) and the booster fan (1). The controller (100) determines whether actuation of the ventilation device (10a, 10b) is requested or not, and outputs an actuation signal to the air supply fan (26) to the ventilation device (10a, 10b) whose actuation has been requested such that the booster fan (1) is actuated after the air supply fan (26) has been actuated.

9 Claims, 14 Drawing Sheets

(56) References Cited

U.S. PATENT DOCUMENTS

| | | | |
|---|---|---|---|
| 2007/0145158 A1* | 6/2007 | Dietz et al. | 236/1 B |
| 2007/0169927 A1* | 7/2007 | Isaka | 165/248 |
| 2008/0220712 A1* | 9/2008 | Hu | 454/258 |
| 2010/0224688 A1 | 9/2010 | Yabu et al. | |
| 2011/0053488 A1* | 3/2011 | Gans et al. | 454/343 |

FOREIGN PATENT DOCUMENTS

| | | |
|---|---|---|
| JP | 2005-133979 A | 5/2005 |
| JP | 2007-285584 A | 11/2007 |
| JP | 2010-19479 A | 1/2010 |
| WO | WO 2009/044505 A1 | 4/2009 |

* cited by examiner

VENTILATION SYSTEM

TECHNICAL FIELD

The present disclosure relates to ventilation systems.

BACKGROUND ART

A known conventional ventilation device is configured to ventilate a room by exhausting air from the room with an exhaust fan and forcefully supplying outside air in an amount corresponding to the exhausted air to the room with an air supply fan.

Such a ventilation device has various mechanisms for achieving a higher degree of energy saving. For example, a device shown in Patent Document 1 employs a DC motor exhibiting small power consumption, as a motor for driving a fan.

CITATION LIST

Patent Document

PATENT DOCUMENT 1: Japanese Patent Publication No. 2007-285584

SUMMARY OF THE INVENTION

Technical Problem

In the case of using the ventilation device shown in Patent Document 1 in a salt-affected region, for example, a salt filter needs to be installed as a measures against salt damage in an air supply passage. In the case of placing a plurality of ventilation devices in a building, for example, an air supply passage for introducing outside air to each of the ventilation devices needs to be branched into a plurality of passages. However, in the former case, a pressure loss occurs when outside air passes through the salt filter. In the latter case, a pressure loss occurs when outside air is branched in the air supply passage. Accordingly, each of these cases involves a problem of an insufficient amount of air supply by the air supply fan.

In view of this problem, to strengthen intake power of the air supply fan, a booster fan can be placed upstream of the air supply fan. In this case, if the booster fan operates while the ventilation device is stopped, the air supply fan runs at idle under an influence of outside air drawn by the booster fan. When the actuation power of the ventilation device is turned on while the air supply fan is running at idle, large break-in current flows in the DC motor driving the air supply fan. For this reason, the ventilation device needs to be further improved in terms of motor protection.

It is therefore an object of the present disclosure to provide a ventilation system which includes a ventilation device provided with a ventilation fan driven by a DC motor and a booster fan for strengthening ventilation power of the ventilation fan, and ensures protection of the ventilation fan against break-in current occurring at turn-on of the ventilation device.

Solution to the Problem

To achieve the object, a first aspect of the present disclosure is directed to a ventilation system including: a ventilation device (10) including an inlet (63) for introducing outside air into a room (30), an outlet (67) for exhausting room air to an outside (40), and an air supply fan (26) configured to be driven by a DC motor, draw outside air through the inlet (63), and supply the outside air to the room (30); and a booster fan (1) placed upstream or downstream in supply air of the air supply fan (26), and configured to strengthen outside-air intake power of the air supply fan (26).

In the first aspect, the ventilation system further includes a ventilation control unit (101) configured to actuate the air supply fan (26) when actuation of the ventilation device (10) is requested; and a booster fan control unit (102) configured to stop the booster fan (1) until actuation of the ventilation device (10) in a stopped state is requested, and upon a request of actuation of the ventilation device (10) in the stopped state, to actuate the booster fan (1) after the ventilation control unit (101) has actuated the air supply fan (26).

In the first aspect, in a case where the ventilation device (10) is stopped (i.e., the air supply fan (26) is stopped), upon a request of actuation of the ventilation device (10), the air supply fan is actuated, thereby performing room ventilation. Then, after the air supply fan (26) has been actuated, the booster fan (1) is actuated.

In a second aspect of the present disclosure, the ventilation system of the first aspect further includes: a damper (60) placed in an air passage (61, 62) between the booster fan (1) and the air supply fan (26) of the ventilation device (10) and configured to open/close the air passage (61, 62); and a damper control unit (103) configured to, upon a request of actuation of the ventilation device (10) in the stopped state, keep the damper (60) in a closed state from the request of actuation of the ventilation device (10) until the ventilation control unit (101) actuates the air supply fan (26) of the ventilation device (10), and switch the damper (60) to an open state after the air supply fan (26) has been actuated.

In the second aspect, in a case where the ventilation device (10) is stopped (i.e., the air supply fan (26) is stopped), upon a request of actuation of the ventilation device (10), the damper (60) is kept in the closed state from the actuation request until the ventilation control unit (101) actuates the air supply fan (26).

On the other hand, after the ventilation control unit (101) has actuated the air supply fan (26), the damper (60) is switched to the open state, thereby opening the air passage (61, 62) between the booster fan (1) and the air supply fan (26).

A third aspect of the present disclosure is directed to a ventilation system including: a plurality of ventilation devices (10) each including an inlet (63) for introducing outside air into a room (30), an outlet (67) for exhausting room air to an outside (40), and an air supply fan (26) configured to be driven by a DC motor, draw outside air through the inlet (63), and supply the outside air to the room (30); and a booster fan (1) placed upstream or downstream in supply air of the air supply fan (26), and configured to strengthen outside-air intake power of the air supply fan (26).

The ventilation system of the third aspect further includes: the a ventilation control unit (101) configured to actuate the air supply fan (26) of at least one of the ventilation devices (10) whose actuation has been requested; and a booster fan control unit (102) configured to actuate the booster fan (1) when at least one of the ventilation devices (10) is in an actuation state. In a case where part of the ventilation devices (10) is actuated, upon a request of actuation of one of the ventilation devices (10) in a stopped state, the booster fan control unit (102) temporarily stops the booster fan (1) before the ventilation control unit (101) actuates the air supply fan (26) of the ventilation device (10) in the stopped state whose actuation has been requested, and the booster fan control unit (102) then actuates the booster fan (1) again after the air supply fan (26) has been actuated.

In the third aspect, in a case where at least one of the ventilation devices (10) is actuated (i.e., the air supply fan (26) is actuated), the booster fan (1) is actuated. Accordingly, in a case where at least one of the ventilation devices (10) is actuated, the booster fan (1) is actuated. In this state, upon a request of actuation of the ventilation device (10) in the stopped state, the booster fan (1) is temporarily stopped before the air supply fan (26) of this ventilation device (10) is actuated. Then, after the air supply fan (26) has been actuated, the booster fan (1) is actuated again.

A fourth aspect of the present disclosure is directed to a ventilation system including: a ventilation device (10) including an inlet (63) for introducing outside air into a room (30), an outlet (67) for exhausting room air to an outside (40), and an exhaust fan (25) configured to be driven by a DC motor, draw room air, and exhaust the room air to the outside (40) through the outlet (67); and a booster fan (1) placed upstream or downstream in exhaust air of the exhaust fan (25), and configured to strengthen room-air intake power of the exhaust fan (25).

In the fourth aspect, the ventilation system further includes: a ventilation control unit (101) configured to actuate the exhaust fan (25) upon a request of actuation of the ventilation device (10); and a booster fan control unit (102) configured to stop the booster fan (1) until actuation of the ventilation device (10) in a stopped state is requested, and upon a request of actuation of the ventilation device (10) in the stopped state, to actuate the booster fan (1) after the ventilation control unit (101) has actuated the exhaust fan (25).

In the fourth aspect, in a case where the ventilation device (10) is stopped (i.e., the exhaust fan (25) is stopped), upon a request of actuation of the ventilation device (10), the exhaust fan (25) is actuated, thereby performing room ventilation. Then, after the exhaust fan (25) has been actuated, the booster fan (1) is actuated, thereby strengthening room-air intake power of the exhaust fan (25).

In a fifth aspect of the present disclosure, the ventilation system of the fourth aspect further includes: a damper (60) placed in an air passage (61, 62) between the booster fan (1) and the exhaust fan (25) of the ventilation device (10) and configured to open/close the air passage (61, 62); and a damper control unit (103) configured to, upon a request of actuation of the ventilation device (10) in the stopped state, keep the damper (60) in a closed state from the request of actuation of the ventilation device (10) until the ventilation control unit (101) actuates the exhaust fan (25) of the ventilation device (10), and switch the damper (60) to an open state after the exhaust fan (25) has been actuated.

In the fifth aspect, in a case where the ventilation device (10) is stopped, upon a request of actuation of the ventilation device (10), the damper (60) is kept in the closed state from the actuation request until the ventilation control unit (101) actuates the exhaust fan (25).

On the other hand, after the ventilation control unit (101) has actuated the exhaust fan (25), the damper (60) is switched to the open state, thereby opening the air passage (61, 62) between the booster fan (1) and the exhaust fan (25).

A sixth aspect of the present disclosure is directed to a ventilation system including: a plurality of ventilation devices (10) each including an inlet (63) for introducing outside air into a room (30), an outlet (67) for exhausting room air to an outside (40), and an exhaust fan (25) configured to be driven by a DC motor, draw room air, and exhaust the room air to the outside (40) through the outlet (67); and a booster fan (1) placed upstream or downstream in exhaust air of the exhaust fan (25), and configured to strengthen room-air intake power of the exhaust fan (25).

In the sixth aspect, the ventilation system further includes: a ventilation control unit (101) configured to actuate the exhaust fan (25) of one of the ventilation devices (10) whose actuation has been requested; and a booster fan control unit (102) configured to actuate the booster fan (1) when at least one of the ventilation devices (10) is in an actuation state. In a case where at least one of the ventilation devices (10) is actuated, upon a request of actuation of one of the ventilation devices (10) in a stopped state, the booster fan control unit (102) temporarily stops the booster fan (1) before the ventilation control unit (101) actuates the exhaust fan (25) of the ventilation device (10) in the stopped state whose actuation has been requested, and the booster fan control unit (102) then actuates the booster fan (1) again after the exhaust fan (25) has been actuated.

In the sixth aspect, in a case where at least one of the ventilation devices (10) is actuated (i.e., the exhaust fan (25) is actuated), the booster fan (1) is actuated. Accordingly, in a case where part of the ventilation devices (10) is actuated, the booster fan (1) is actuated. In this state, upon a request of actuation of one of the ventilation devices (10) in the stopped state, the booster fan (1) is temporarily stopped before the exhaust fan (25) of this ventilation device (10) is actuated. Then, after the exhaust fan (25) has been actuated, the booster fan (1) is actuated again.

In a seventh aspect of the present disclosure, in the ventilation system of the second or fifth aspect, the ventilation device (10) includes a channel switching mechanism (83) configured to perform switching between a humidity control ventilation mode in which ventilation is performed with room air subjected to humidity control and a simple ventilation mode in which ventilation is performed with air in the room (30) subjected to no humidity control, and the damper (60) forms the channel switching mechanism (83).

In the seventh aspect, the channel switching mechanism (83) for switching the mode of the ventilation device (10) is employed to form the damper (60).

Advantages of the Invention

As described above, in the first aspect, in the ventilation system including: the ventilation device (10) including the air supply fan (26) and the exhaust fan (25) each configured to be driven by a DC motor; and the booster fan (1) placed upstream or downstream in supply air of the air supply fan (26), in a case where actuation of the ventilation device (10) is requested, the booster fan (1) is actuated after the air supply fan (26) has been actuated. Accordingly, it is possible to prevent the air supply fan (26) from starting up while running at idle due to an intake airflow from the booster fan (1), thereby ensuring protection of the air supply fan (26) against break-in current at a start-up thereof.

In the second aspect, in a case where actuation of the ventilation device (10) is requested, an air supply passage between the booster fan (1) and the air supply fan (26) can be shut off from the actuation request until the air supply fan (26) is actuated. Accordingly, it is possible to prevent the air supply fan (26) from running at idle, thereby ensuring protection of the air supply fan (26) against break-in current at a start-up thereof.

In the third aspect, in the ventilation system including: the plurality of ventilation devices (10) each including the air supply fan (26) configured to be driven by a DC motor; and the booster fan (1) placed upstream or downstream in supply air of the air supply fan (26), in a case where part the ventilation devices (10) is actuated, upon a request of actuation of one of the ventilation devices (10) in a stopped state, the booster fan (1) is temporarily stopped. Accordingly, it is possible to prevent the air supply fan (26) from starting up while running at idle due to an intake airflow from the booster fan (1), thereby ensuring protection of the air supply fan (26) against break-in current at a start-up thereof.

In the fourth aspect, in the ventilation system including: the ventilation device (10) including the exhaust fan (25) configured to be driven by a DC motor; and the booster fan (1) placed upstream or downstream in exhaust air of the exhaust fan (25), in a case where actuation of the ventilation device (10) is requested, the booster fan (1) is actuated after the exhaust fan (25) has been actuated. Accordingly, it is possible to prevent the exhaust fan (25) from starting up while running at idle due to an intake airflow from the booster fan (1), thereby ensuring protection of the exhaust fan (25) against break-in current at a start-up thereof.

In the fifth aspect, in a case where actuation of the ventilation device (10) is requested, an exhaust passage between the booster fan (1) and the exhaust fan (25) can be shut off from the actuation request until the exhaust fan (25) is actuated. Accordingly, it is possible to prevent the exhaust fan (25) from running at idle, thereby ensuring protection of the exhaust fan (25) against break-in current at a start-up thereof.

In the sixth aspect, in the ventilation system including: the plurality of ventilation devices (10) each including the exhaust fan (25) configured to be driven by a DC motor; and the booster fan (1) placed upstream or downstream in exhaust air of the exhaust fan (25), in a case where part the ventilation devices (10) is actuated, upon a request of actuation of one of the ventilation devices (10) in a stopped state, the booster fan (1) is temporarily stopped. Accordingly, it is possible to prevent the exhaust fan (25) from starting up while running at idle due to an intake airflow from the booster fan (1), thereby ensuring protection of the exhaust fan (25) against break-in current at a start-up thereof.

In the seventh aspect, the channel switching mechanism (83) for switching the mode of the ventilation device (10) is employed to form the damper (60), thereby reducing the number of components to achieve cost reduction of the entire system.

BRIEF DESCRIPTION OF THE DRAWINGS

FIG. 13(A) shows operation in first operation, and FIG. 13(B) shows operation in second operation.

DESCRIPTION OF EMBODIMENTS

Embodiments of the present disclosure will be described in detail hereinafter with reference to the drawings.

First Embodiment

Figure 1:
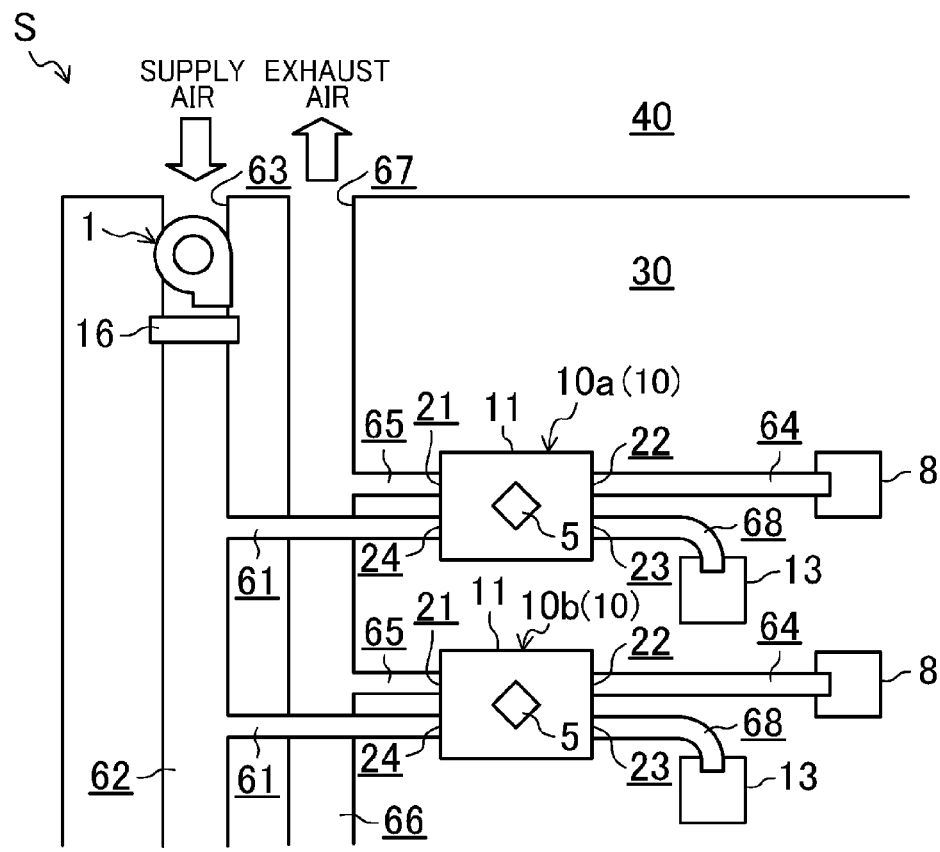
FIG. 1 is a view schematically illustrating a ventilation system according to an embodiment.

FIG. 1 illustrates a ventilation system (S) according to an embodiment of the present disclosure. The ventilation system (S) includes two ventilation devices (10) (a first ventilation device (10a) and a second ventilation device (10b)) and a booster fan (1).

Figure 2:
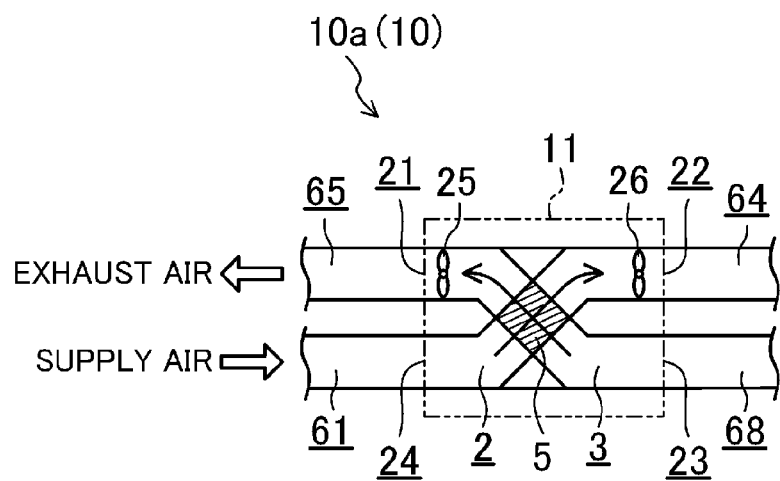
FIG. 2 is a view schematically illustrating a configuration of a ventilation device included in the ventilation system.

The first ventilation device (10a) and the second ventilation device (10b) have the same configuration, and are so-called total enthalpy heat exchanger type ventilation devices. As illustrated in FIG. 2 (where only the first ventilation device (10a) is shown), each of the ventilation devices (10a, 10b) includes a casing (11) having an air supply passage (2) and an exhaust passage (3). The casing (11) includes a heat exchanger (5) configured to exchange heat between supply air flowing in the air supply passage (2) and exhaust air flowing in the exhaust passage (3). The casing (11) is formed such that the air supply passage (2) and the exhaust passage (3) cross each other in the heat exchanger (5).

The air supply passage (2) includes an air supply fan (26) composed of a DC fan (i.e., a fan using a DC motor as a drive source). An outside-air inlet (24) at the upstream end in supply air of the air supply passage (2) (i.e., toward the outside) communicates with an outside air-supply passage (61). The outside air-supply passage (61) communicates with a common air-supply passage (62) at its upstream end in supply air. The common air-supply passage (62) communicates with an outside (40) at a ventilation opening (corresponding to an inlet) (63) in the upstream end in supply air of the common air-supply passage (62). An air supply opening (22) at the downstream end in supply air (i.e., toward the room) of the air supply passage (2) communicates with a room air-supply passage (64).

The exhaust passage (3) is provided with an exhaust fan (25) composed of a DC fan. An exhaust opening (21) at the downstream end in exhaust air (i.e., at the outside) of the exhaust passage (3) communicates with an outside exhaust passage (65). The outside exhaust passage (65) communicates with a common exhaust passage (66) at its downstream end in exhaust air. The common exhaust passage (66) communicates with the outside (40) at a ventilation opening (corresponding to an outlet) (67) at the downstream end in exhaust air (i.e., toward the outside) of the common exhaust passage (66). A room-air inlet (23) at the upstream end in exhaust air (i.e., toward the room) of the exhaust passage (3) communicates with a room-side exhaust passage (68).

The booster fan (1) for assisting air supply by the air supply fan (26) is placed at a position near the ventilation opening (63) in the common air-supply passage (62). The booster fan (1) is composed of a DC fan in the same manner as the air supply fan (26) and the exhaust fan (25), and actuation of the booster fan (1) is controlled by a controller (100), which will be described later. A salt filter (16) is provided downstream in supply air of the booster fan (1). The salt filter (16) is used for removing salt contained in outside air in, for example, a salt-affected region (e.g., a coastal region), and is composed of a meshed filter element whose surface is provided with water-repellent coating, for example.

Figure 3:
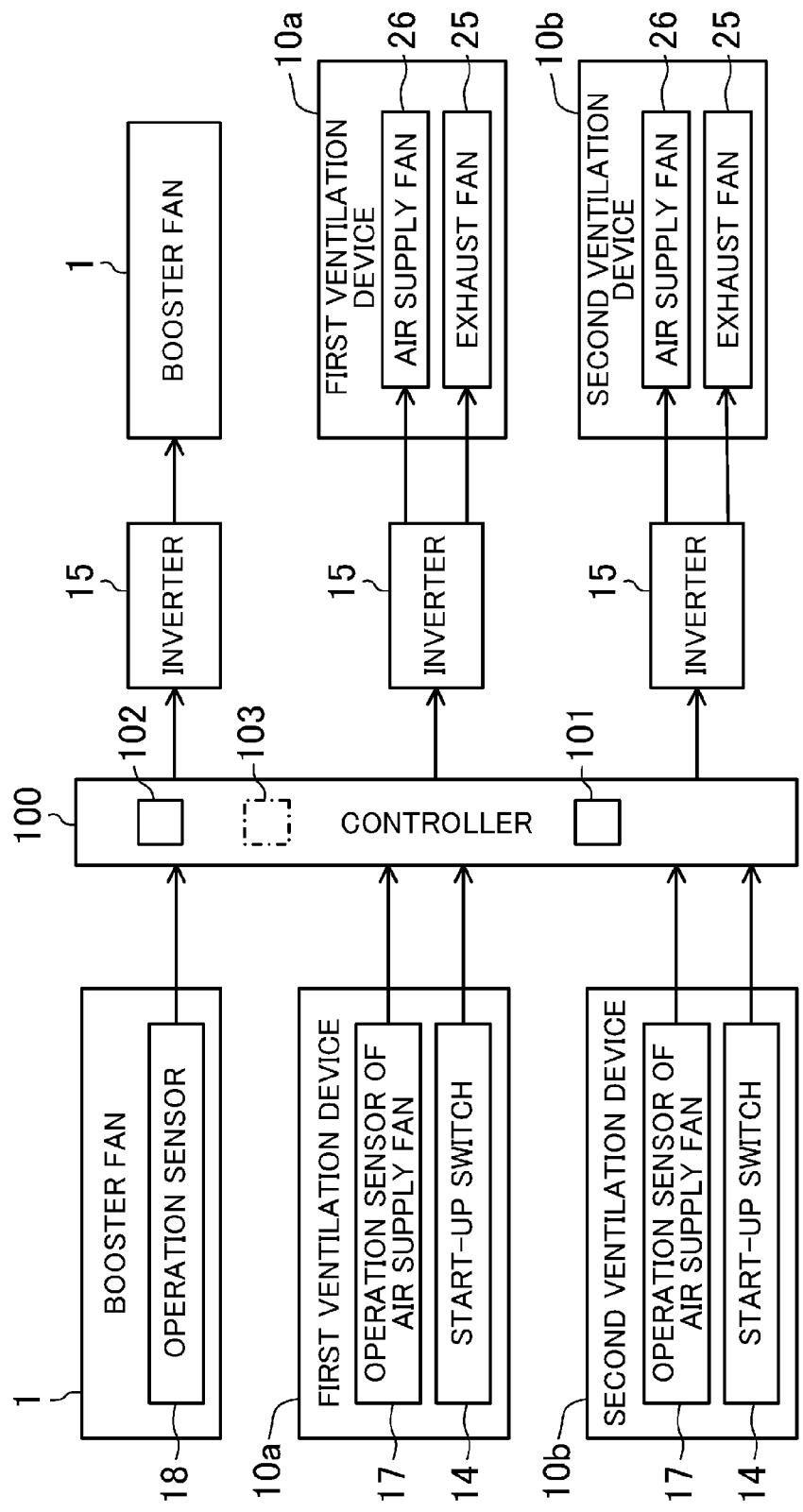
FIG. 3 is a block diagram illustrating a configuration of a control system of the ventilation system.

As illustrated in FIG. 3, each of the ventilation devices (10a, 10b) has a start-up switch (14). Each of the ventilation devices (10a, 10b) is configured to switch between an actuation state in which both of the air supply fan (26) and the exhaust fan (25) are actuated and a stopped state in which these fans (25, 26) are stopped, by operation of the start-up switch (14) by a user. Each of the ventilation devices (10a, 10b) is in the actuation state while the start-up switch (14) is on, and is in the stopped state while the start-up switch (14) is off.

When the ventilation device (10a, 10b) is switched to the actuation state, the air supply fan (26) and the exhaust fan (25) are actuated. Accordingly, air flows from the outside (40) into the common air-supply passage (62) through the ventilation opening (67), the booster fan (1), and the salt filter (16). This outside air passes through the outside air-supply passage (61), and then flows into the air supply passage (2) in the ventilation device (10a, 10b). Thereafter, the air passes through the heat exchanger (5), and then is taken from an air supply grille (8) into a room (30) through the room air-supply passage (64). On the other hand, air in the room (30) flows from an exhaust air grille (13) into the air exhaust passage (3) of the ventilation device (10a, 10b) through the room-side exhaust passage (68). This room air passes through the heat exchanger (5), flows into the common exhaust passage (66) through the outside exhaust passage (65), and then is discharged to the outside (40) through a ventilation opening (67). In this manner, the air supply fan (26) and the exhaust fan (25) are actuated, thereby ventilating the room by discharging room air containing a high concentration of pollutants (e.g., carbon dioxide, carbon oxide, and dust) to the outside (40), and also taking new air from the outside (40) into the room (30).

Actuation of the air supply fan (26) and the exhaust fan (25) (e.g., drive motors for the fans (25, 26)) are controlled by the controller (100) through a dedicated inverter (15).

The air supply fan (26) includes an operation sensor (17) (see FIG. 3). The operation sensor (17) detects the rotation speed of the drive motor for the air supply fan (26) as a fan rotation speed. When the detected fan rotation speed is a predetermined rotation speed or more, the operation sensor (17) outputs an actuation detection signal. On the other hand, when the detected fan rotation speed is less than the predetermined rotation speed, the operation sensor (17) outputs a nonactuation detection signal. In the same manner, the booster fan (1) is composed of a DC fan using a DC motor as a drive source. Actuation of the booster fan (1) (i.e., the drive motor for the booster fan (1)) is controlled by the controller (100) through a dedicated inverter (15). The booster fan (1) is also provided with an operation sensor (18), in the same manner as the air supply fan (26).

As illustrated in FIG. 3, the controller (100) is connected to the start-up switches (14) of the ventilation devices (10a, 10b) and the operation sensors (17) for the air supply fans (26) of the ventilation devices (10a, 10b) to transmit and receive signals to/from the start-up switches (14) and the operation sensors (17).

Each of the start-up switches (14) outputs a signal associated with the ON/OFF state of the switch (i.e., an ON signal associated with an ON state or an OFF signal associated with an OFF state) to the controller (100).

The controller (100) includes a ventilation control unit (101) and a booster fan control unit (102). The controller (100) of this embodiment does not include a damper control unit (103) indicated by a chain line in FIG. 3.

The ventilation control unit (101) controls actuation of the ventilation devices (10a, 10b) based on ON/OFF signals from the start-up switches (14). Specifically, for each of the ventilation devices (10a, 10b), upon reception of an ON signal from the start-up switch (14), the controller (100) outputs an actuation signal to the air supply fan (26) and the exhaust fan (25) through the inverter (15) so as to actuate the fans (25, 26). For the ventilation device (10a, 10b), upon reception of an OFF signal from the start-up switch (14), the ventilation control unit (101) outputs a stop signal to the air supply fan (26) and the exhaust fan (25) through the inverter (15) so as to stop the fans (25, 26).

The booster fan control unit (102) controls actuation of the booster fan (1) based on a signal from the operation sensor (17) provided in the air supply fan (26) of the ventilation device (10a, 10b).

Specifically, the booster fan control unit (102) is configured to actuate the booster fan (1) in a case where at least one of the ventilation devices (10a, 10b) is in the actuation state.

In a case where the ventilation device (10a, 10b) in the stopped state, the booster fan control unit (102) stops the booster fan (1) until actuation of the ventilation device (10a, 10b) is requested. On the other hand, when actuation of the ventilation device (10a, 10b) is requested, the booster fan (1) is actuated after the ventilation control unit (101) has actuated the air supply fan (26).

In addition, in a case where one of the ventilation devices (10a, 10b) is in the actuation state and actuation of the other ventilation device (10a, 10b) in the stopped state is requested, the booster fan control unit (102) temporarily stops the booster fan (1) before actuation of the air supply fan (26) of the ventilation device (10a, 10b) whose actuation has been requested, and then, after this air supply fan (26) has been actuated, actuates the booster fan (1) again.

Figure 4:
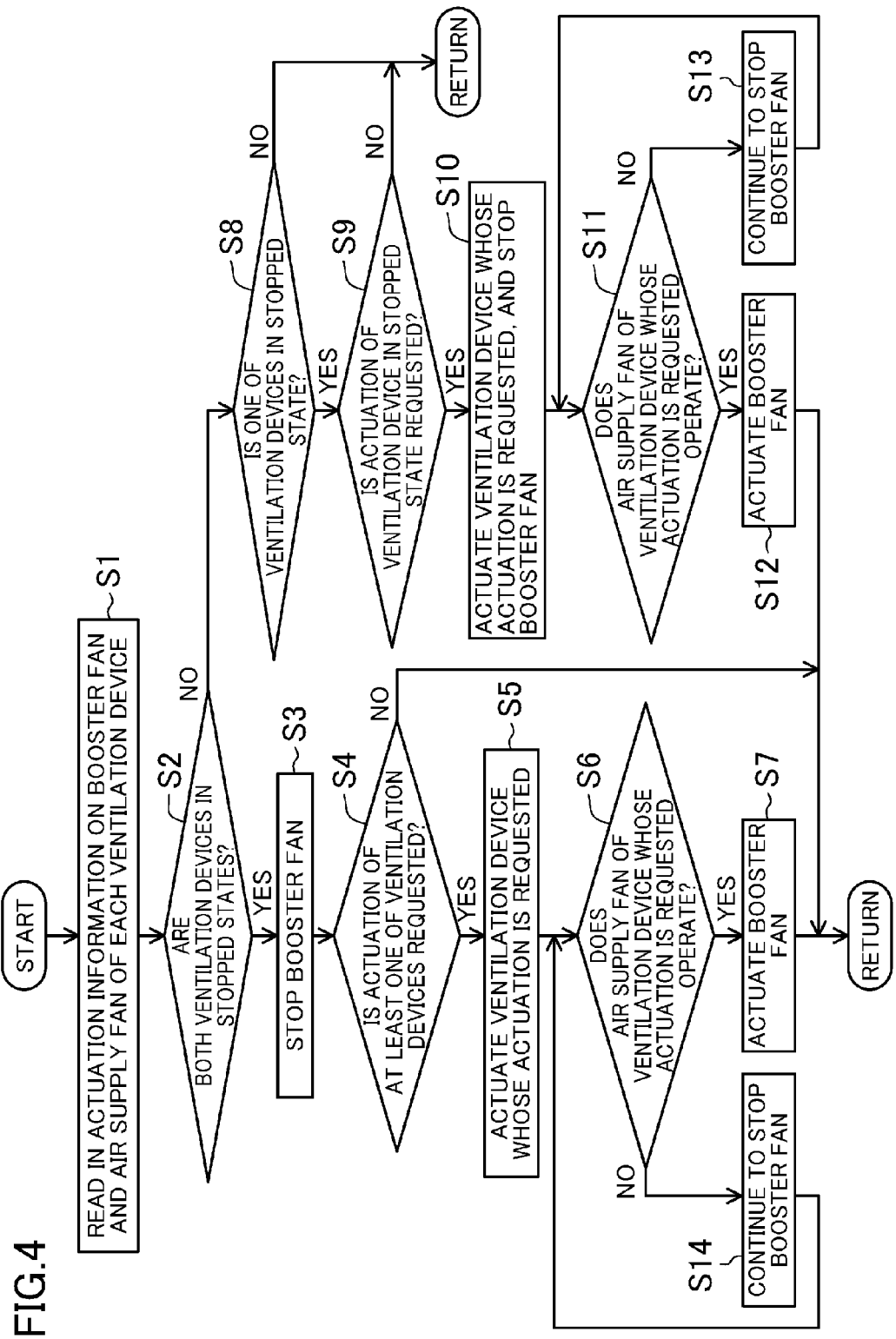
FIG. 4 is a flowchart showing actuation control of a ventilation device and a booster fan in a controller.

Actuation control of the booster fan (1) by the controller (100) will be described based on the flowchart of FIG. 4.

In step S1, signals are read in from the operation sensors (17, 18) provided in the air supply fan (26) of each of the ventilation devices (10a, 10b) and the booster fan (1).

In step S2, based on the signals read in step S1, it is determined whether both of the ventilation devices (10a, 10b) are in the stopped states (i.e., the air supply fan (26) and the exhaust fan (25) are stopped) or not. If the answer is NO, the process proceeds to step S8. On the other hand, if the answer is YES, the process proceeds to step S3.

In step S3, a stop signal is output to the booster fan (1) through the inverter (15) so as to control the booster fan (1).

In step S4, it is determined whether actuation of at least one of the ventilation devices (10a, 10b) is requested or not (i.e., an ON signal from the start-up switch (14) is received or not). If the answer is NO, the process returns. On the other hand, if the answer is YES, the process proceeds to step S5.

In step S5, an actuation signal is output to the air supply fan (26) and the exhaust fan (25) through the inverter (15) so as to actuate the fans (25, 26) of the ventilation device (10a, 10b) whose actuation has been requested.

In step S6, it is determined whether the air supply fan (26) of the ventilation device (10a, 10b) whose actuation has been requested is actuated or not (i.e., an actuation detection signal from the operation sensor (17) of this air supply fan (26) is received or not). If the answer is NO, the process proceeds to step S14. On the other hand, if the answer is YES, the process proceeds to step S7.

In step S7, an actuation signal is output to the booster fan (1) through the inverter (15) so as to actuate the booster fan (1), and then the process returns.

In step S8 to which the process proceeds if the answer in step S2 is NO, it is determined whether one of the ventilation devices (10a, 10b) is in the stopped state or not based on the signals read in step S1. If the answer is NO, the process returns. On the other hand, if the answer is YES, the process proceeds to step S9.

In step S9, it is determined whether actuation of the ventilation device (10a, 10b) which was determined to be in the stopped state in step S8 is requested or not (i.e., an ON signal from the start-up switch (14) is received or not). If the answer is No, the process returns. On the other hand, if the answer is YES, the process proceeds to step S10.

In step S10, to actuate the air supply fan (26) and the exhaust fan (25) of the ventilation device (10a, 10b) whose actuation has been request, an actuation signal is output to the fans (25, 26) through the inverter (15). In addition, to temporarily stop the booster fan (1), a stop signal is output to the booster fan (1) through the inverter (15).

In step S11, it is determined whether the air supply fan (26) of the ventilation device (10a, 10b) whose actuation has been requested is actuated or not (i.e., an actuation detection signal from the operation sensor (17) of this air supply fan (26) is received or not). If the answer is NO, the process proceeds to step S13. On the other hand, if the answer is YES, the process proceeds to step S12.

In step S12, to actuate the booster fan (1) again, an actuation signal is output to the booster fan (1) through the inverter (15).

In step S13 to which the process proceeds if the answer in step S11 is NO, the stop signal continues to be output to the booster fan (1), and then the process returns to step S11.

In step S14 to which the process proceeds if the answer in step S6 is NO, the stop signal continues to be output to the booster fan (1), and then the process returns to step S6.

Figure 5:
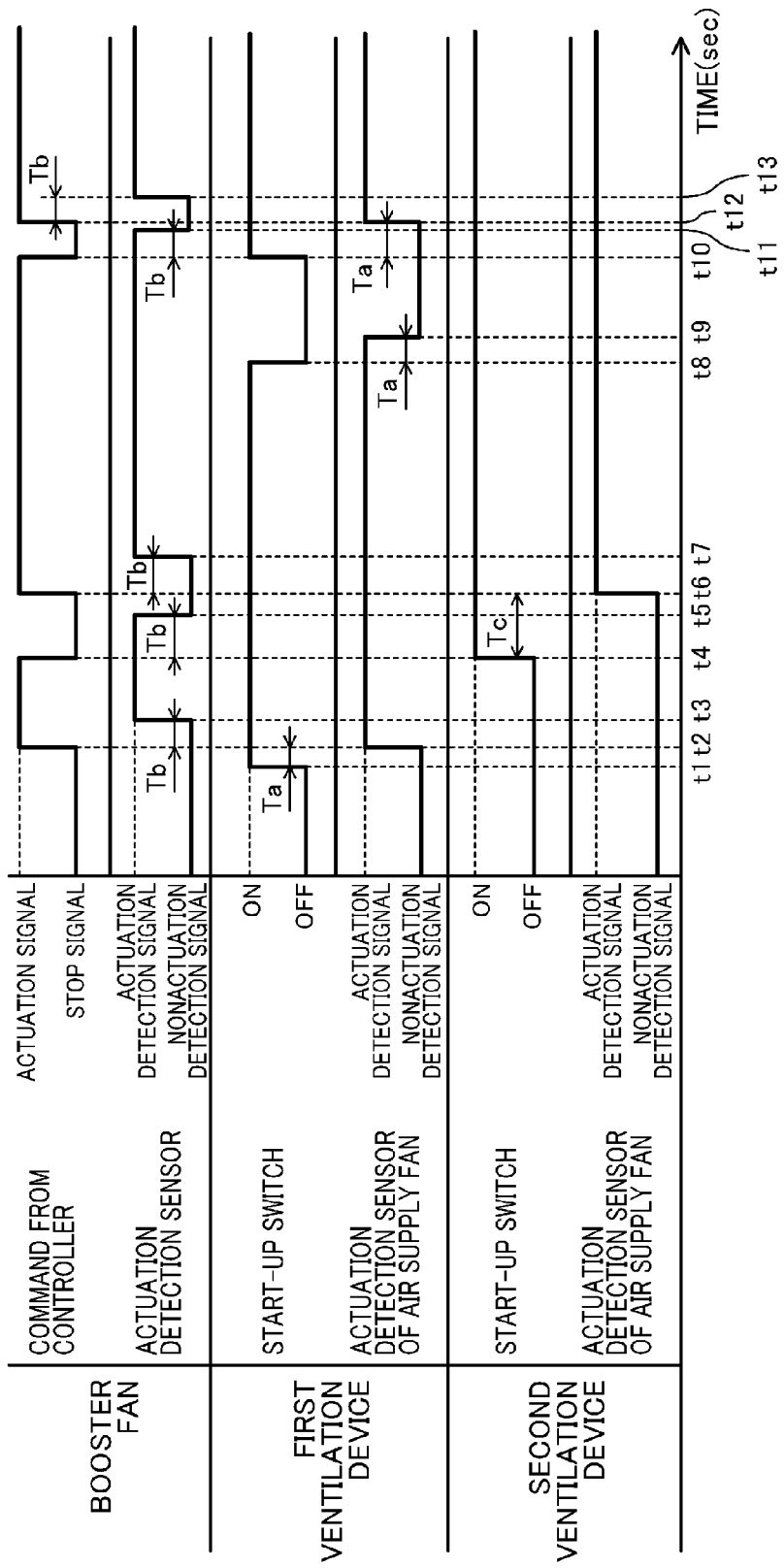
FIG. 5 is a timing chart for describing actuation control of the ventilation device and the booster fan in the controller.

An example of control of the ventilation system (S) with the above configuration will now be described based on the time chart of FIG. 5. In FIG. 5, before time t1, the start-up switches (14) of the ventilation devices (10a, 10b) are in the OFF states, and the ventilation devices (10a, 10b) are in the stopped states. At time t1, the start-up switch (14) of the first ventilation device (10a) is turned on, and an ON signal is output from the start-up switch (14) of the first ventilation device (10a). Upon reception of this ON signal, the controller (100) outputs an actuation signal to the air supply fan (26) and the exhaust fan (25) of the first ventilation device (10a). Consequently, at time t2 after a lapse of a predetermined time Ta from time t1, the air supply fan (26) and the exhaust fan (25) of the first ventilation device (10a) are actuated (where only the actuation state of the air supply fan (26) is shown in FIG. 5). In this embodiment, a time lag from reception of an actuation signal by the fan (25, 26) to actuation of the fan (25, 26) is set at Ta. Alternatively, this time lag may differ between the air supply fan (26) and the exhaust fan (25).

When the air supply fan (26) of the first ventilation device (10a) is actuated at time t2, an actuation detection signal is output from the operation sensor (17) of this air supply fan (26). Upon reception of this actuation detection signal, the controller (100) outputs an actuation signal to the booster fan (1). Consequently, at time t3 after a lapse of a predetermined time Tb from time t2, the booster fan (1) is actuated.

After the booster fan (1) has been actuated, when the start-up switch (14) of the second ventilation device (10b) in the stopped state is turned on at time t4, an ON signal is output from this start-up switch (14). Upon reception of this ON signal, the controller (100) outputs an actuation signal to the air supply fan (26) and the exhaust fan (25) of the second ventilation device (10b), and also outputs a stop signal to the booster fan (1). Consequently, at time t5 after a lapse of a predetermined time Tb from time t4, the booster fan (1) is stopped. Then, at time t6 after a lapse of a predetermined time Tc from time t4, the air supply fan (26) and the exhaust fan (25) of the second ventilation device (10b) are actuated.

When the air supply fan (26) of the second ventilation device (10b) is actuated at time t6, an actuation detection signal is output from the operation sensor (17) of the air supply fan (26). Upon reception of this actuation detection signal, the controller (100) outputs an actuation signal to the booster fan (1). Consequently, at time t7 after a lapse of a predetermined time Tb from time t6, the booster fan (1) is actuated.

Thereafter, when the start-up switch (14) of the first ventilation device (10a) is turned off at time t8, an OFF signal is output from the start-up switch (14). Upon reception of this OFF signal, the controller (100) outputs a stop signal to the air supply fan (26) and the exhaust fan (25) of the first ventilation device (10a). Consequently, at time t9 after a lapse of a predetermined time Ta from time t8, the fans (25, 26) are stopped. At this time, although the first ventilation device (10a) is in the stopped step, the second ventilation device (10b) is in the actuation state. Accordingly, the booster fan (1) is not stopped, and continues to be actuated.

Subsequently, when the start-up switch (14) of the first ventilation device (10a) is turned on at time t10, an ON signal is output from the start-up switch (14). Upon reception of this ON signal, the controller (100) outputs an actuation signal to the air supply fan (26) and the exhaust fan (25) of the first ventilation device (10a), and also outputs a stop signal to the booster fan (1).

Consequently, at time t11 after a lapse of a predetermined time Ta from time t10, the booster fan (1) is stopped. At time t12 after a lapse of a predetermined time Ta (>Tb), the air supply fan (26) and the exhaust fan (25) of the first ventilation device (10a) are actuated.

When the air supply fan (26) and the exhaust fan (25) of the first ventilation device (10a) are actuated at time t12, an actuation detection signal is output from the operation sensor (17) of this air supply fan (26). Upon reception of this actuation detection signal, the controller (100) outputs an actuation signal to the booster fan (1). Consequently, at time t13 after a lapse of a predetermined time Tb from time t12, the booster fan (1) is actuated.

In this manner, in the first embodiment, in a case where both of the ventilation devices (10a, 10b) are in the stopped states (i.e., the answer in step S2 is YES), when actuation of at least one of the ventilation devices (10a, 10b) is requested (i.e., the answer in step S4 is YES), the booster fan (1) is actuated after the air supply fan (26) of the ventilation device (10a, 10b) whose actuation has been requested has been actuated (i.e., after the answer in step S6 has been YES).

In this manner, it is possible to prevent the air supply fan (26) from starting up while running at idle due to an airflow from the booster fan (1). This operation ensures protection of the air supply fan (26) (a DC motor for driving the air supply fan (26)) against break-in current occurring at a start-up thereof.

In addition, in the first embodiment, in a case where one of the ventilation devices (10a, 10b) is actuated (i.e., the answer in step S8 is YES), when actuation of the other ventilation device (10a, 10b) in the stopped state is requested (i.e., the answer in step S9 is YES), the controller (100) temporarily stops the booster fan (1) (i.e., performs processing in step S10) before actuation of the air supply fan (26) of the ventilation device (10a, 10b) whose actuation has been requested, and then, actuates the booster fan (1) again (i.e., performs processing in step S12) after the air supply fan (26) has been actuated.

In this manner, in starting up the other ventilation device (10a, 10b) in the stopped state, it is possible to prevent the air supply fan (26) of this ventilation device (10a, 10b) from starting up while running at idle due to an airflow from the booster fan (1). This operation further ensures protection of the air supply fan (26) against break-in current occurring at a start-up thereof.

The booster fan control unit (102) of the first embodiment actuates the booster fan (1) at time t3 after a lapse of a predetermined time Tb from time t2 when the air supply fan (26) of the first ventilation device (10a) was actuated. Alternatively, the booster fan control unit (102) may actuate the booster fan (1) at the same time (i.e., time t2) as the air supply fan (26) of the first ventilation device (10a) is actuated. That is, the booster fan control unit (102) only needs to actuate the booster fan (1) after the air supply fan (26) has been actuated.

In addition, the booster fan control unit (102) of the first embodiment actuates the booster fan (1) at time t7 after a lapse of a predetermined time Tb from time t6 when the air supply fan (26) of the second ventilation device (10b) as actuated, with the air supply fan (26) of the first ventilation device (10a) being actuated. Alternatively, the booster fan control unit (102) may actuate the booster fan (1) at the same time (i.e., time t6) as the air supply fan (26) of the second ventilation device (10b) is actuated. That is, the booster fan control unit (102) only needs to actuate the booster fan (1) after the air supply fan (26) has been actuated. In this point, the booster fan control unit (102) may actuate the booster fan (1) at time t12.

Second Embodiment

Figure 6:
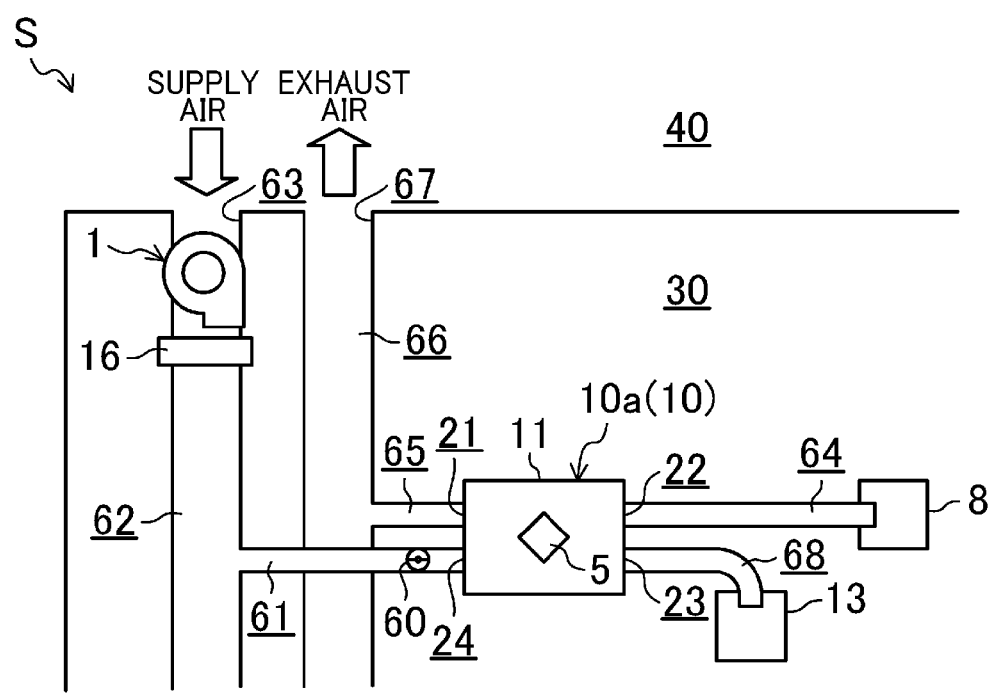
FIG. 6 is a view illustrating a second embodiment and corresponding to FIG. 1.

FIG. 6 illustrates a second embodiment of the present disclosure. The second embodiment differs from the first embodiment in the number of ventilation devices (10) and in that an idle-running prevention mechanism for preventing idle-running of the air supply fan (26) is provided in the second embodiment. In FIG. 6, identical or equivalent elements to those in FIG. 1 are designated by like reference characters, and explanation thereof is not repeated. In the following embodiments, the layout of the booster fan (1) and the configurations of air passages (61-67) are similar to those in the first embodiment, and explanation thereof is not repeated.

In this embodiment, a ventilation system (S) includes one ventilation device (10a) and a booster fan (1).

The ventilation system (S) includes an open/close damper (60) as the idle-running prevention mechanism mentioned above in an outside air-supply passage (61). The ventilation system (S) also includes a controller (100) illustrated in FIG. 3. The controller (100) includes a ventilation control unit (101) and a booster fan control unit (102), and also includes a damper control unit (103) indicated by a chain line in FIG. 3.

The damper (60) is electrically connected to the controller (100), and is opened or closed in response to an open/close signal from the damper control unit (103) of the controller (100).

When the damper (60) is open, the damper (60) blocks the outside air-supply passage (61) to shut off an airflow from the booster fan (1) to the air supply fan (26). On the other hand, when the damper (60) is closed, the damper (60) opens the outside air-supply passage (61) to cancel the shut-off of the airflow.

In a case where the ventilation device (10a) is in the stopped state, upon a request of actuation of this ventilation device (10a), the damper control unit (103) keeps the damper (60) in the closed state from the request of actuation of the ventilation device (10a) until the ventilation control unit (101) actuates the air supply fan (26) of the ventilation device (10a). After the air supply fan (26) has been actuated, the damper control unit (103) switches the damper (60) to the open state.

Figure 7:
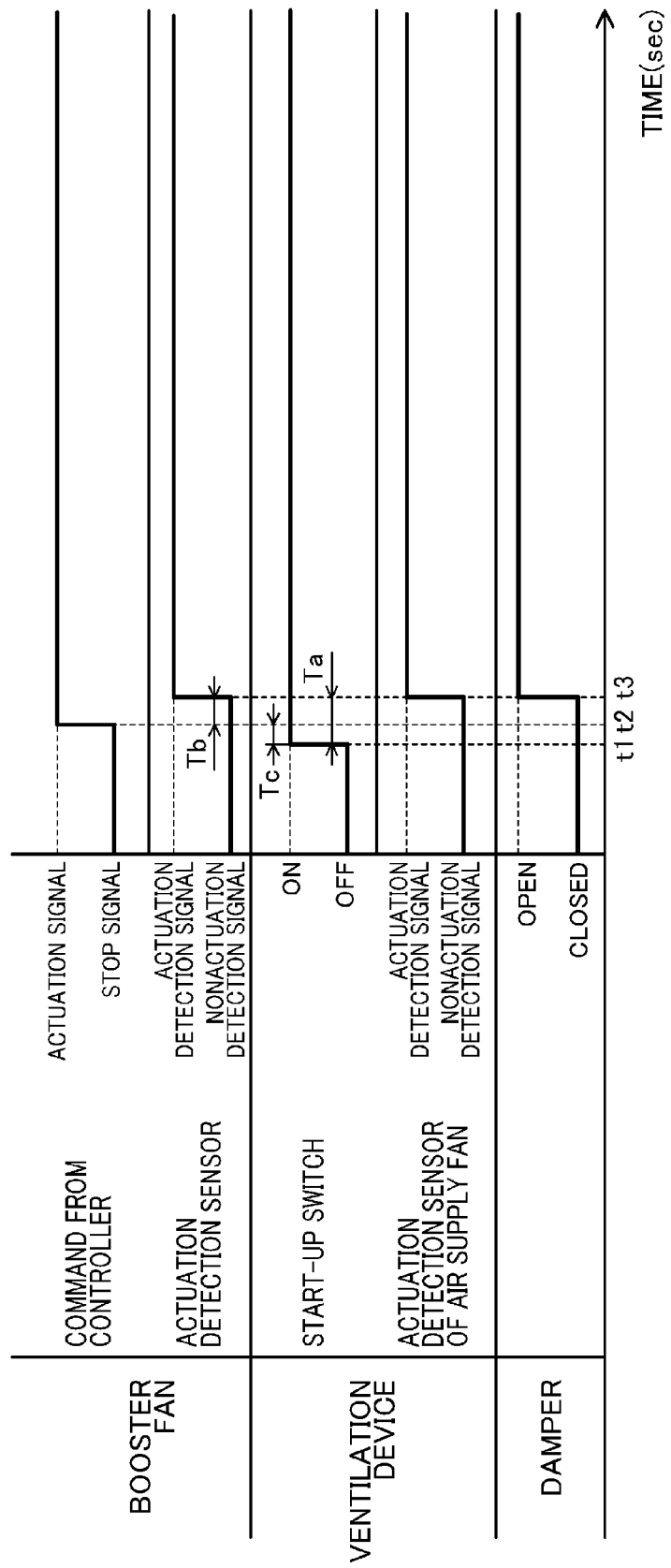
FIG. 7 is a view illustrating the second embodiment and corresponding to FIG. 4.

Specifically, as illustrated in FIG. 7, in a case where the start-up switch (14) of the ventilation device (10a) is off, the damper control unit (103) controls the damper (60) to the closed state until the start-up switch (14) is turned on (i.e., until time t1).

In the case where the start-up switch (14) of the ventilation device (10a) is off, when the start-up switch (14) is turned on, the damper control unit (103) keeps the damper (60) in the closed state during a period from when the start-up switch (14) is turned on to when the air supply fan (26) is actuated (i.e., from time t1 to time t3). In this case, when the air supply fan (26) is actuated (i.e., at time t3), the damper control unit (103) switches the damper (60) to the open state. Specifically, upon reception of an ON signal from the start-up switch (14) (i.e., at time t1), the controller (100) outputs an actuation signal to the air supply fan (26) and the exhaust fan (25) of the ventilation device (10a) through an inverter (15). At time t2 after a lapse of a predetermined time Tc after time t1, the controller (100) outputs an actuation signal to the booster fan (1) through an inverter (15). Accordingly, at time t3, the booster fan (1) is actuated substantially at the same time as the air supply fan (26) is actuated.

In this embodiment, the time when the damper (60) is switched from the closed state to the open state is set at time t3 (i.e., when the air supply fan (26) is actuated), but may be set at a time after time t3.

The booster fan (1) may be actuated after time t3 when the air supply fan (26) is actuated, as in the first embodiment.

As described above, in the second embodiment, in a case where the ventilation device (10a) is in the stopped state, when actuation of the ventilation device (10a) is requested (i.e., when the start-up switch (14) of the ventilation device (10a) is turned on), the controller (100) controls the damper (60) in the closed state until the air supply fan (26) is actuated (i.e., time t<time t3). Accordingly, in a period from when actuation of the ventilation device (10a) is requested to when the air supply fan (26) is actuated, it is possible to prevent the air supply fan (26) from running at idle by shutting off an air passage (61, 62) between the booster fan (1) and the air supply fan (26) with the damper (60). This operation can prevent the air supply fan (26) from starting up while running at idle due to an airflow from the booster fan (1). As a result, it is possible to ensure protection of the air supply fan (26) against break-in current at a start-up thereof.

In addition, in the second embodiment, in a case where the ventilation device (10a) is in the stopped state, after the air supply fan (26) has been actuated upon a request of actuation of the ventilation device (10a) (i.e., t3≤time t), the controller (100) controls the damper (60) to the open state, thereby opening the air passage (61, 62) between the booster fan (1) and the air supply fan (26). Accordingly, after actuation of the air supply fan (26), outside air can be drawn by both of the air supply fan (26) and the booster fan (1). As a result, as described above, even in a configuration in which the salt filter (16) is placed upstream of the air supply fan (26), the room can be sufficiently ventilated without degradation of air intake power of the air supply fan (26).

Third Embodiment

FIGS. 8-14 illustrate a third embodiment of the present disclosure. The third embodiment differs from the second embodiment in the configurations of the ventilation device (10a) and the idle-running prevention mechanism. In FIGS. 8-14, identical or equivalent elements to those in FIG. 6 are designated by like reference characters, and explanation thereof is not repeated.

Specifically, in this embodiment, a ventilation device (10a) is configured to be switchable between two operations (operation modes): a humidity control ventilation mode and a simple ventilation mode. In the humidity control ventilation mode of the ventilation device (10a), the ventilation device (10a) is switchable between dehumidification and humidification. The ventilation device (10a) includes bypass dampers (83 and 84) for switching between the humidity control ventilation mode and the simple ventilation mode. The bypass dampers (83 and 84) form a channel switching mechanism. In this embodiment, the first bypass damper (83) is used as an idle-running prevention mechanism.

As illustrated in FIGS. 8-12, the ventilation device (10a) includes a casing (11). An outside-air inlet (24), a room-air inlet (23), an air supply opening (22), and an exhaust opening (21) are provided in side surfaces of the casing (11). The ventilation device (10a) is configured such that outside air is taken through the outside-air inlet (24) and supplied to a room (30) through the air supply opening (22) and room air is taken through the room-air inlet (23) and supplied to outside the room through the exhaust opening (21).

Figure 13:
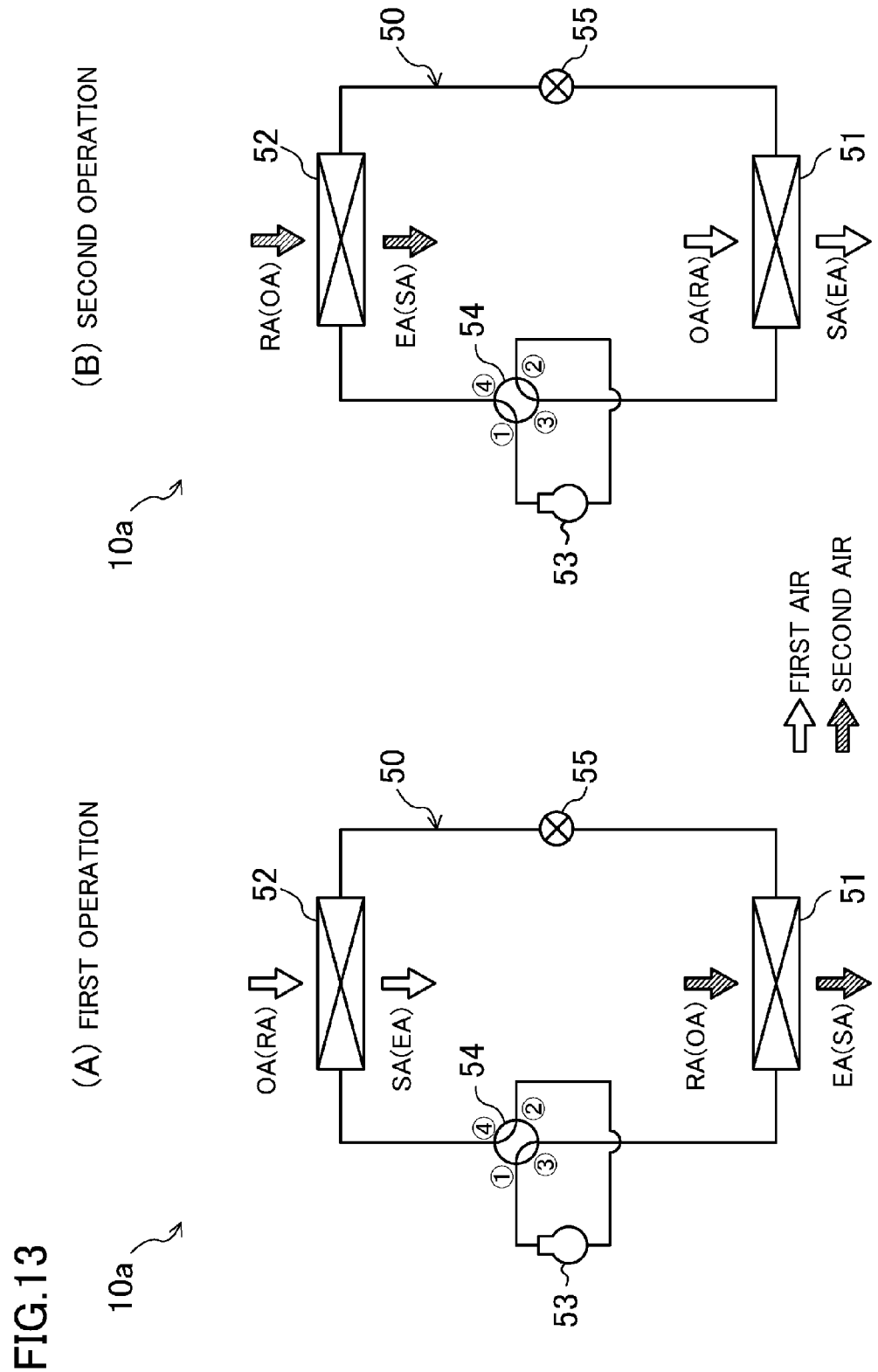
FIG. 13 shows a piping system showing a configuration of a refrigerant circuit.

The casing (11) houses a refrigerant circuit (50) (see FIG. 13). This refrigerant circuit (50) is connected to a first adsorption heat exchanger (51), a second adsorption heat exchanger (52), a compressor (53), a four-way change over valve (54), and an electric expansion valve (55).

Configuration of Refrigerant Circuit

The refrigerant circuit (50) will now be described with reference to FIG. 13.

The refrigerant circuit (50) is a closed circuit including the first adsorption heat exchanger (51), the second adsorption heat exchanger (52), the compressor (53), the four-way change over valve (54), and the electric expansion valve (55). This refrigerant circuit (50) circulates a charged refrigerant, thereby performing a vapour compression refrigeration cycle.

In the refrigerant circuit (50), a discharge side of the compressor (53) is connected to a first port of the four-way change over valve (54), and a suction side of the compressor (53) is connected to a second port of the four-way change over valve (54). An end of the first adsorption heat exchanger (51) is connected to a third port of the four-way change over valve (54). The other end of the first adsorption heat exchanger (51) is connected to an end of the second adsorption heat exchanger (52) through the electric expansion valve (55). The other end of the second adsorption heat exchanger (52) is connected to a fourth port of the four-way change over valve (54).

The four-way change over valve (54) is switchable between a first state (i.e., a state shown in FIG. 13(A)) in which the first port and the third port communicate with each other and the second port and the fourth port communicate with each other and a second state (i.e., a state shown in FIG. 13(B)) in which the first port and the fourth port communicate with each other and the second port and the third port communicate with each other.

In the ventilation device (10a) of this embodiment, the refrigerant circuit (50) forms a heating medium circuit. In this refrigerant circuit (50), a high-pressure gas refrigerant is supplied as a heating medium for heating to one of the adsorption heat exchangers (51 and 52) operating as a condenser, whereas a low-pressure gas-liquid two-phase refrigerant is supplied as a heating medium for cooling to the other adsorption heat exchanger (51, 52) operating as an evaporation.

Configuration of Adsorption Heat Exchanger

In each of the first adsorption heat exchanger (51) and the second adsorption heat exchanger (52), an adsorbent is supported on the surface of a fin-and-tube heat exchanger.

Figure 14:
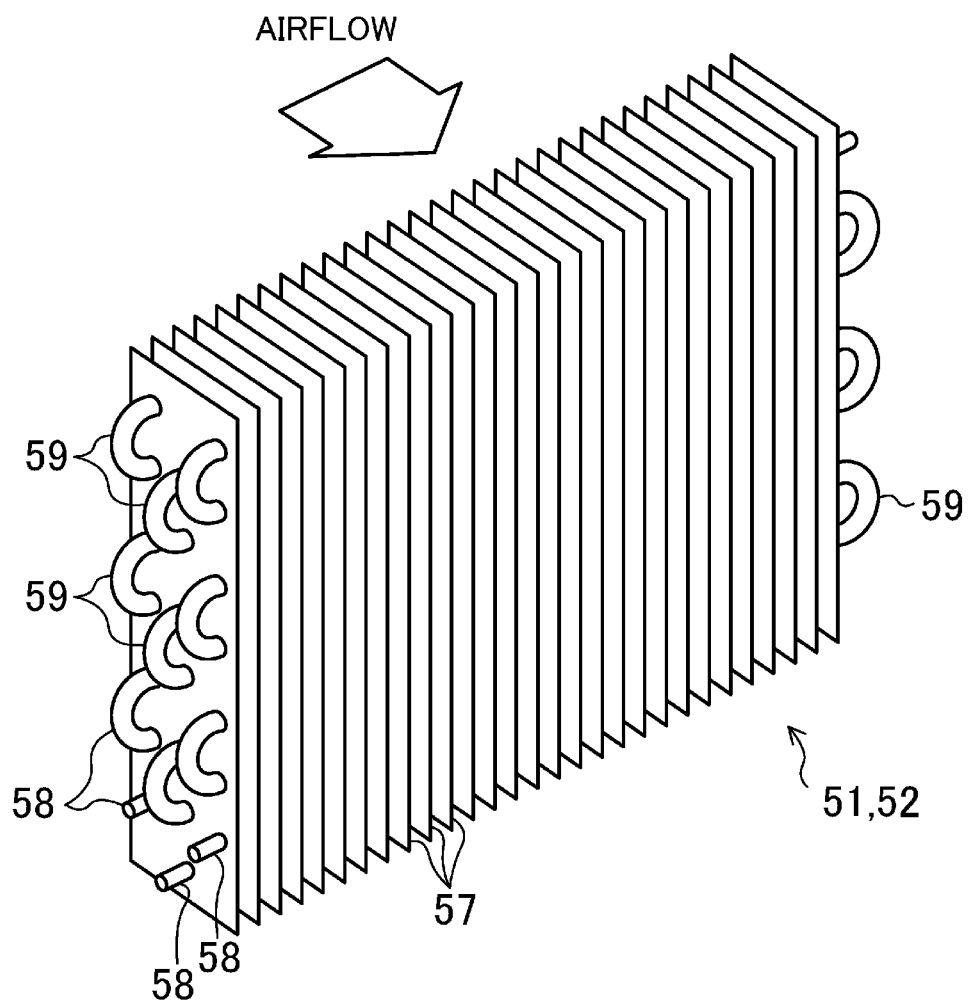
FIG. 14 is a perspective view schematically illustrating an adsorption heat exchanger.

As illustrated in FIG. 14, each of the adsorption heat exchangers (51 and 52) includes copper heat exchanger tubes (58) and aluminium fins (57). The fins (57) of each of the adsorption heat exchangers (51 and 52) are in the shape of rectangular plates, and arranged at regular intervals. The heat exchanger tubes (58) have serpentine forms in the direction of arrangement of the fins (57). Specifically, in the heat exchanger tubes (58), straight tube portions penetrating the fins (57) and the U-shaped tube portions (59) each connecting adjacent ones of the straight tube portions are alternately provided. In each of the adsorption heat exchangers (51 and 52), an adsorbent is supported on the surface of each of the fins (57), and air passing between the fins (57) comes into contact with the adsorbent supported on the fins (57).

In the adsorption heat exchangers (51 and 52) of this embodiment, an hygroscopic organic polymeric material is used as an adsorbent. In the organic polymeric material used as an adsorbent, a plurality of polymer backbones having hydrophilia polar groups in molecules are cross-linked, and the cross-linked polymer backbones form a three-dimensional structure.

The adsorbent of this embodiment swells by taking water vapour (i.e., moisture absorption). A mechanism in which this adsorbent swells by moisture absorption is assumed to be as follows. Specifically, when the adsorbent absorbs moisture, water vapour is adsorbed on hydrophilia polar groups, and an electrical load caused by reaction between the hydrophilia polar groups and water vapour acts on polymer backbones, resulting in deformation of the polymer backbones. Then, water vapour is taken in the clearance between the deformed polymer backbones, thereby causing the three-dimensional structures of the polymer backbones to swell. As a result, the volume of the adsorbent increases.

In this manner, with respect to the adsorbent of this embodiment, both adsorption of water vapour on the adsorbent and absorption of water vapour in the adsorbent occur. That is, water vapour is sorbed on the adsorbent. The water vapour taken by the adsorbent enters not only the surface of the three-dimensional structure of a plurality of cross-linked polymer backbones but also the inside of this three-dimensional structure. Consequently, a large amount of water vapour is taken by the adsorbent, as compared to, for example, zeolite which allows adsorption of water vapour only on its surface.

In addition, this adsorbent contracts by desorbing water vapour (i.e., desorbing moisture). Specifically, when the adsorbent desorbs moisture, the amount of water taken in the clearance between polymer backbones decreases, and the shape of the three-dimensional structure of polymer backbones gradually recovers, thereby causing the volume of the adsorbent to decrease.

The material used as the adsorbent of this embodiment is not limited to the material described above as long as the adsorbent swells by moisture absorption and contracts by moisture desorption. The material used as the adsorbent may be a hygroscopic ion-exchange resin, for example.

Configuration of Controller

The ventilation device (10a) is controlled by the controller (100) illustrated in FIG. 3. In a manner similar to those in the above embodiments, the controller (100) controls actuation of an air supply fan (26) and an exhaust fan (25) and actuation of a booster fan (1), opens/closes dampers (41-48, 83, and 84), adjusts operation capacity of the compressor (53) and the opening degree of the electric expansion valve (55), and switches the four-way change over valve (54), for example.

Operation

The ventilation device (10a) of this embodiment can operate in three operation modes (i.e., a dehumidification ventilation mode, a humidification ventilation mode, and a simple ventilation mode). That is, the ventilation device (10a) selectively performs the dehumidification ventilation mode, the humidification ventilation mode, and the simple ventilation mode. In this embodiment, a user can select a desired operation mode and switch the ventilation device (10a) between the actuation state and the stopped state by operating a control switch, which is not shown.

In the dehumidification ventilation mode or the humidification ventilation mode, the ventilation device (10a) adjusts humidity of outside air (OA) which has been taken in, and supplies the outside air (OA) as supply air (SA) to a room (30), and at the same time, discharges room air (RA) which has been taken in to outside the room as exhaust air (EA). On the other hand, the ventilation device (10a) in the simple ventilation mode supplies outside air (OA) which has been taken in to the room (30) as supply air (SA) without change, and at the same time, exhausts room air (RA) which has been taken in to an outside (40) as exhaust air (EA) without change.

Dehumidification Ventilation Mode

The ventilation device (10a) in the dehumidification ventilation mode alternately performs first operation and second operation, which will be described later, at predetermined time intervals (e.g., at 3-minute intervals). In this dehumidification ventilation mode, the first bypass damper (83) and the second bypass damper (84) are always in the closed states.

In the ventilation device (10a) in the dehumidification ventilation mode, when the air supply fan (26) operates, outside air is taken in the casing (11) as first air through the outside-air inlet (24). When the exhaust fan (25) operates, room air is taken in the casing (11) as second air through the room-air inlet (23).

Figure 8:
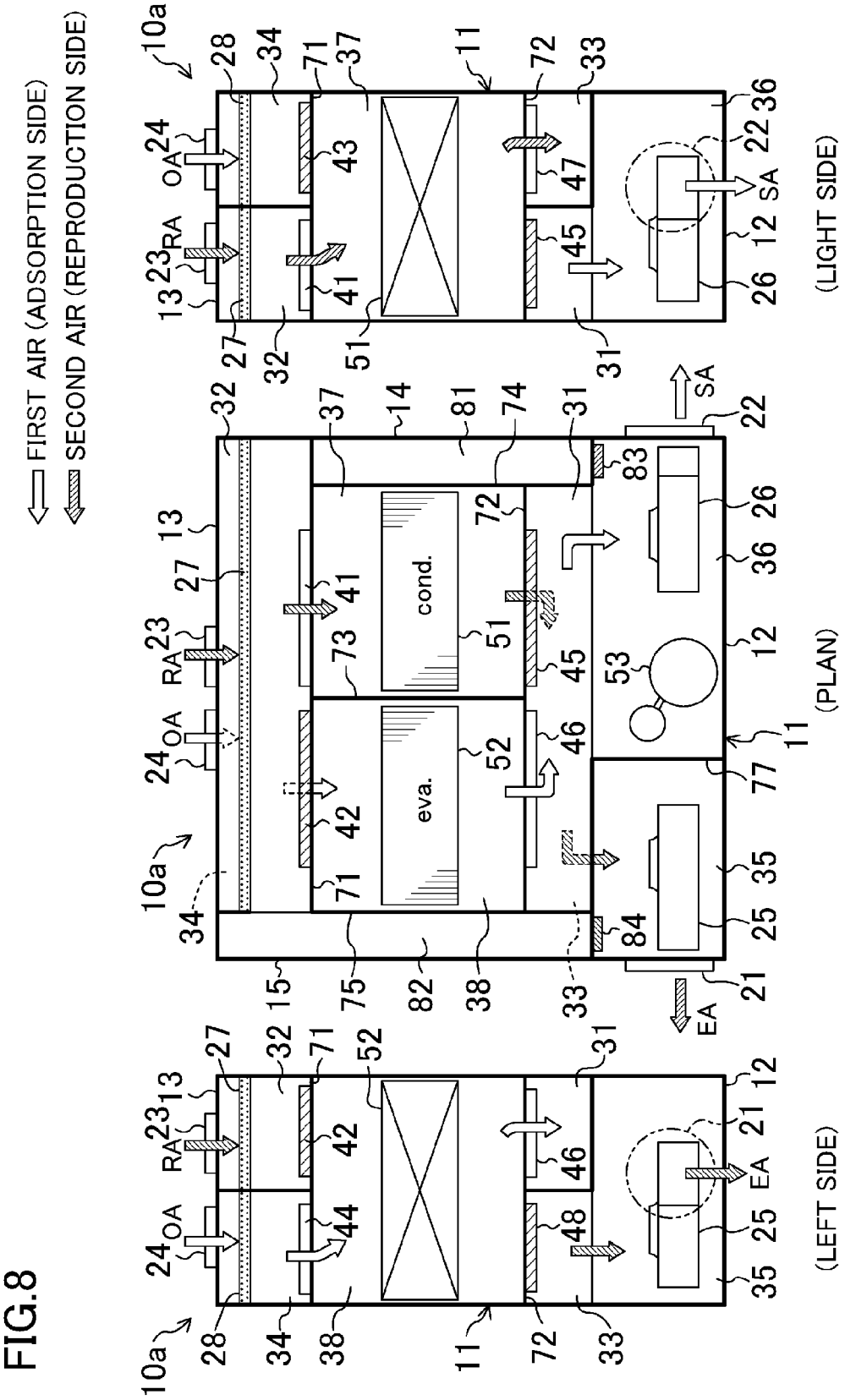
FIG. 8 shows a plan view, a right-side view, and a left-side view of a humidity control device and schematically illustrates an airflow in first operation of dehumidification ventilation.

Now, first operation of the dehumidification ventilation mode will be described. As illustrated in FIG. 8, in this first operation, a first room air damper (41), a second outside air damper (44), a second supply air damper (46), and a first exhaust air damper (47) are open, whereas a second room air damper (42), a first outside air damper (43), a first supply air damper (45), and a second exhaust air damper (48) are closed.

As illustrated in FIG. 13(A), in the refrigerant circuit (50) in this first operation, the four-way change over valve (54) is set in the first state. In the refrigerant circuit (50) in this state, a refrigerant circulates, thereby performing a refrigeration cycle. At this time, in the refrigerant circuit (50), a refrigerant discharged from the compressor (53) passes through the first adsorption heat exchanger (51), the electric expansion valve (55), and the second adsorption heat exchanger (52) in this order, the first adsorption heat exchanger (51) serves as a condenser, and the second adsorption heat exchanger (52) serves as an evaporator.

The first air which has flown into an outside air passage (34) passes through the second outside air damper (44), flows into a second heat exchanger chamber (38), and then passes through the second adsorption heat exchanger (52). In the second adsorption heat exchanger (52), an adsorbent supported on the surface of the second adsorption heat exchanger (52) absorbs moisture from the first air, and the refrigerant absorbs heat generated in this moisture absorption. The first air which has been dehumidified while passing through the second adsorption heat exchanger (52) flows into a supply air passage (31) through the second supply air damper (46), passes through the air supply fan (26), and is supplied to the room (30) through the air supply opening (22).

On the other hand, the second air which has flown into a room air passage (32) flows into a first heat exchanger chamber (37) through the first room air damper (41), and then passes through the first adsorption heat exchanger (51). In the first adsorption heat exchanger (51), the adsorbent heated by the refrigerant releases moisture, and water vapour desorbed from the adsorbent is provided to the second air. The second air provided with water vapour while passing through the first adsorption heat exchanger (51) flows into an exhaust air passage (33) through the first exhaust air damper (47), passes through the exhaust fan (25), and then is exhausted to the outside (40) through the exhaust opening (21).

Figure 9:
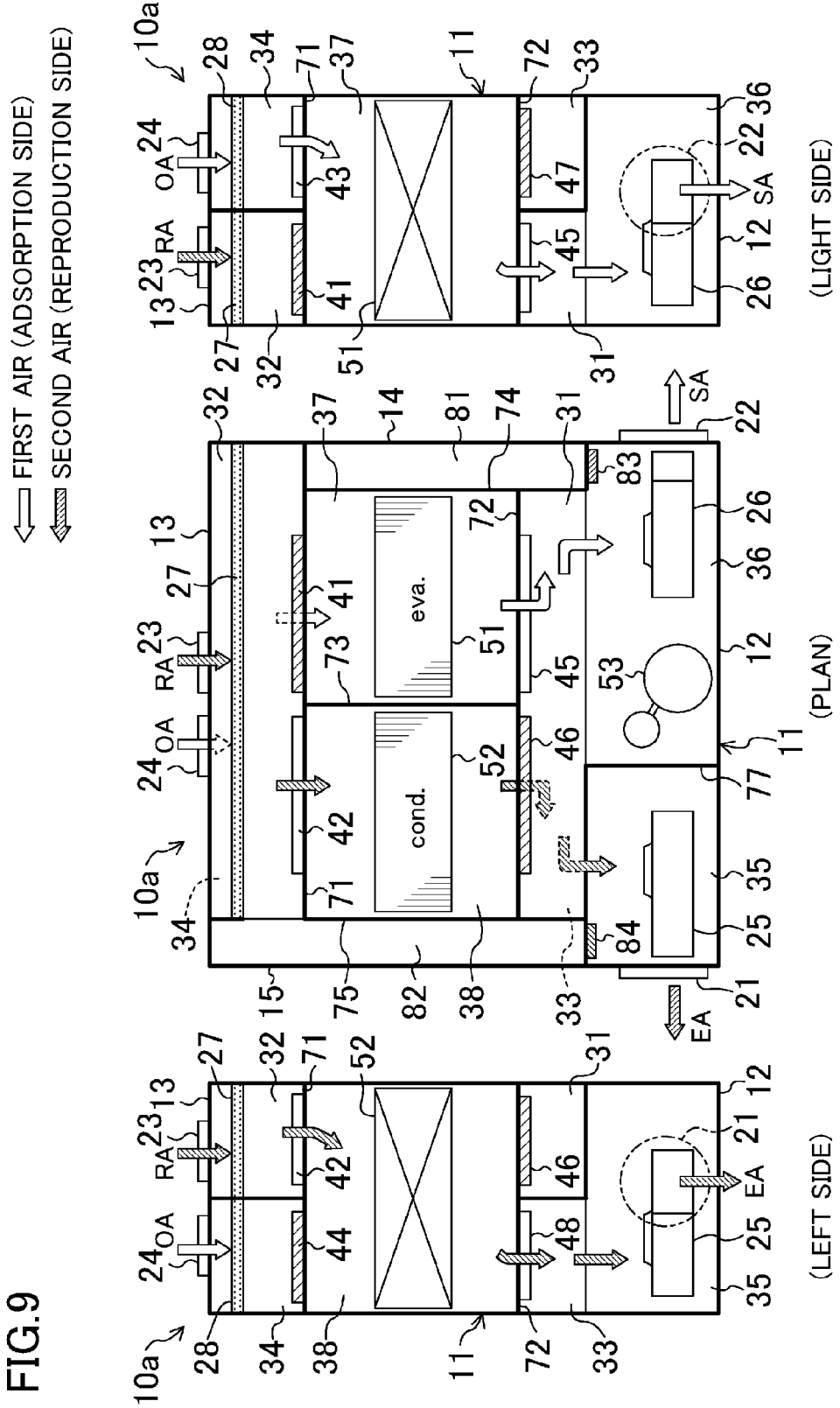
FIG. 9 shows a plan view, a right-side view, and a left-side view of a humidity control device and schematically illustrates an airflow in second operation of dehumidification ventilation in a ventilation device according to a third embodiment.

Next, second operation of the dehumidification ventilation mode will be described. As illustrated in FIG. 9, in this second operation, the second room air damper (42), the first outside air damper (43), the first supply air damper (45), and the second exhaust air damper (48) are open, whereas the first room air damper (41), the second outside air damper (44), the second supply air damper (46), and the first exhaust air damper (47) are closed.

As illustrated in FIG. 13(B), in the refrigerant circuit (50) in this second operation, the four-way change over valve (54) is set in the second state. In the refrigerant circuit (50) in this state, a refrigerant circulates, thereby performing a refrigeration cycle. At this time, in the refrigerant circuit (50), a refrigerant discharged from the compressor (53) passes through the second adsorption heat exchanger (52), the electric expansion valve (55), and the first adsorption heat exchanger (51) in this order, the first adsorption heat exchanger (51) serves as an evaporator, and the second adsorption heat exchanger (52) serves as a condenser.

The first air which has flown into the outside air passage (34) passes through the first outside air damper (43), flows into the first heat exchanger chamber (37), and then passes through the first adsorption heat exchanger (51). In the first adsorption heat exchanger (51), an adsorbent supported on the surface of the first adsorption heat exchanger (51) absorbs moisture from the first air, and the refrigerant absorbs heat generated in this moisture absorption. The first air which has been dehumidified while passing through the first adsorption heat exchanger (51) flows into the supply air passage (31) through the first supply air damper (45), passes through the air supply fan (26), and then is supplied to the room (30) through the air supply opening (22).

On the other hand, the second air which has flown into the room air passage (32) flows into the second heat exchanger chamber (38) through the second room air damper (42), and then passes through the second adsorption heat exchanger (52). In the second adsorption heat exchanger (52), the adsorbent heated by the refrigerant releases moisture, and water vapour released from the adsorbent is provided to the second air. The second air provided with water vapour while passing through the second adsorption heat exchanger (52) flows into the exhaust air passage (33) through the second exhaust air damper (48), passes through the exhaust fan (25), and then is discharged to the outside (40) through the exhaust opening (21).

Humidification Ventilation Mode

The ventilation device (10a) in the humidification ventilation mode alternately performs first operation and second operation, which will be described later, at predetermined time intervals (e.g., at 3-minute intervals). In this humidification ventilation mode, the first bypass damper (83) and the second bypass damper (84) are always in the closed states.

In the ventilation device (10a) in the humidification ventilation mode, when the air supply fan (26) operates, outside air is taken in the casing (11) as second air through the outside-air inlet (24). When the exhaust fan (25) operates, room air is taken in the casing (11) as first air through the room-air inlet (23).

Figure 10:
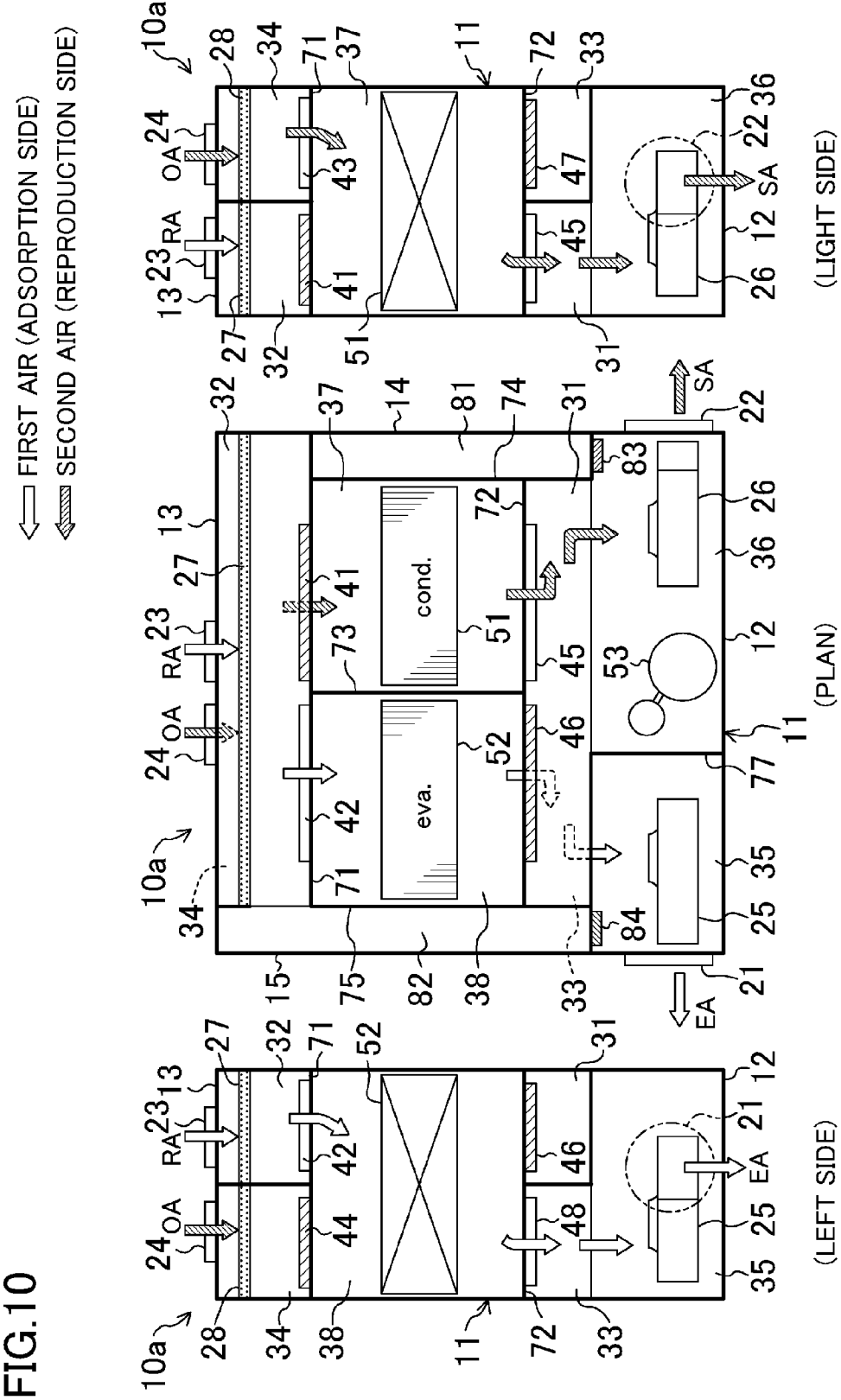
FIG. 10 shows a plan view, a right-side view, and a left-side view of the humidity control device and schematically illustrates an airflow in first operation of humidification ventilation in the ventilation device of the third embodiment.

First, first operation of the humidification ventilation mode will be described. As illustrated in FIG. 10, in this first operation, the second room air damper (42), the first outside air damper (43), the first supply air damper (45), and the second exhaust air damper (48) are open, whereas the first room air damper (41), the second outside air damper (44), the second supply air damper (46), and the first exhaust air damper (47) are closed.

As illustrated in FIG. 13(A), in the refrigerant circuit (50) in this first operation, the four-way change over valve (54) is set in the first state. In the refrigerant circuit (50) in this state, in the same manner as in the first operation of the dehumidification ventilation mode, the first adsorption heat exchanger (51) serves as a condenser, and the second adsorption heat exchanger (52) serves as an evaporator.

The first air which has flown into the room air passage (32) passes through the second room air damper (42), flows into the second heat exchanger chamber (38), and then passes through the second adsorption heat exchanger (52). In the second adsorption heat exchanger (52), an adsorbent supported on the surface of the second adsorption heat exchanger (52) absorbs moisture from the first air, and the refrigerant absorbs heat generated in this moisture absorption. The first air whose moisture has been taken out while passing through the second adsorption heat exchanger (52) flows into the exhaust air passage (33) through the second exhaust air damper (48), passes through the exhaust fan (25), and is supplied to the outside (40) through the exhaust opening (21).

On the other hand, the second air which has flown into the outside air passage (34) flows into the first heat exchanger chamber (37) through the first outside air damper (43), and then passes through the first adsorption heat exchanger (51). In the first adsorption heat exchanger (51), the adsorbent heated by the refrigerant releases moisture, and water vapour released from the adsorbent is provided to the second air. The second air humidified while passing through the first adsorption heat exchanger (51) flows into the supply air passage (31) through the first supply air damper (45), passes through the air supply fan (26), and then is supplied to the room (30) through the air supply opening (22).

Figure 11:
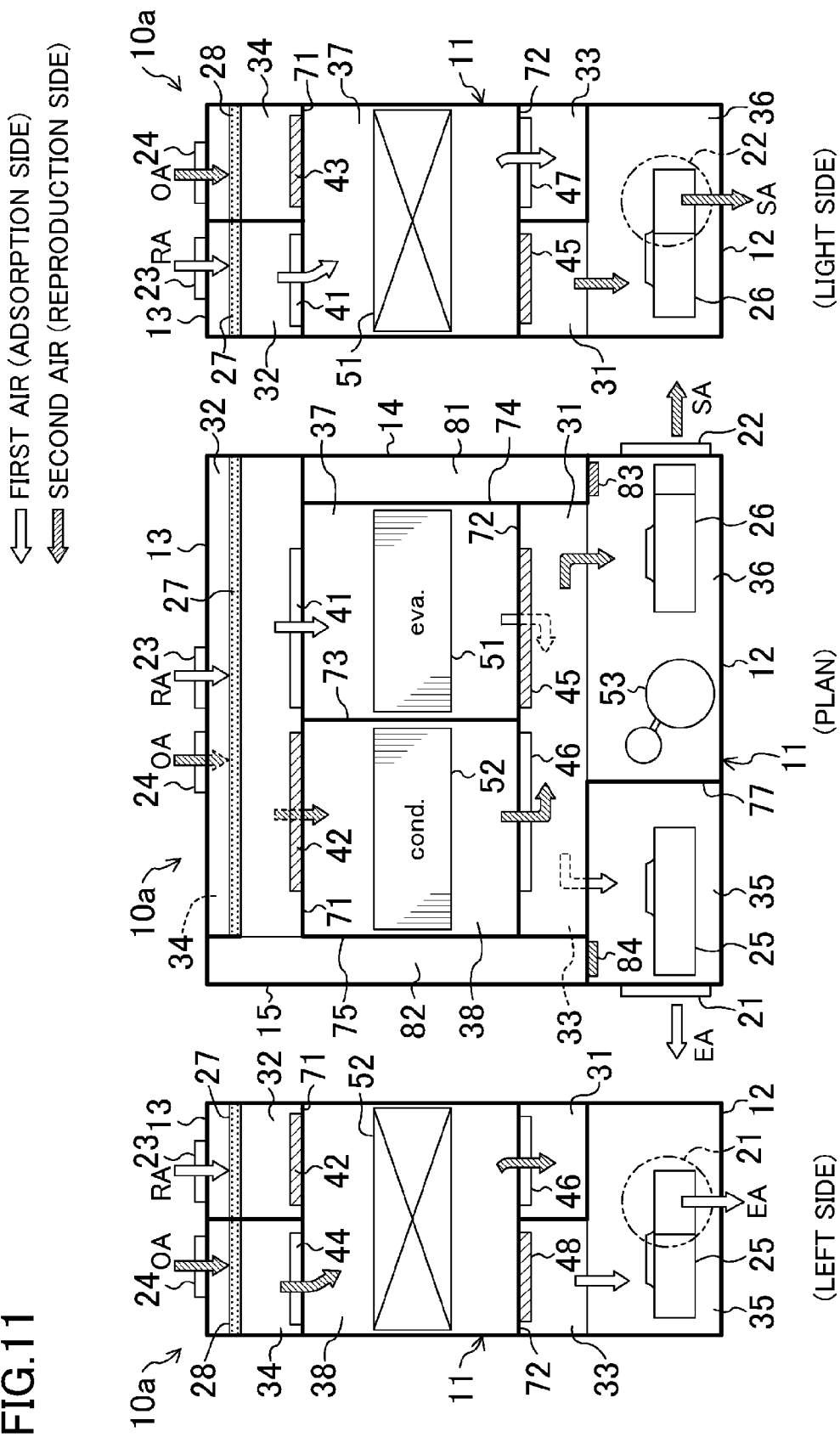
FIG. 11 shows a plan view, a right-side view, and a left-side view of the humidity control device and schematically illustrates an airflow in second operation of humidification ventilation in the ventilation device of the third embodiment.

Next, second operation of the humidification ventilation mode will be described. As illustrated in FIG. 11, in this second operation, the first room air damper (41), the second outside air damper (44), the second supply air damper (46), and the first exhaust air damper (47) are open, whereas the second room air damper (42), the first outside air damper (43), the first supply air damper (45), and the second exhaust air damper (48) are closed.

As illustrated in FIG. 13(B), in the refrigerant circuit (50) in this second operation, the four-way change over valve (54) is set in the second state. In the refrigerant circuit (50) in this state, in the same manner as in the second operation of the dehumidification ventilation mode, the first adsorption heat exchanger (51) serves as an evaporator, and the second adsorption heat exchanger (52) serves as a condenser.

The first air which has flown into the room air passage (32) and has passed through a room air filter (27) flows into the first heat exchanger chamber (37) through the first room air damper (41), and then passes through the first adsorption heat exchanger (51). In the first adsorption heat exchanger (51), an adsorbent supported on the surface of the first adsorption heat exchanger (51) absorbs moisture from the first air, and the refrigerant absorbs heat generated in this moisture absorption. The first air whose moisture has been taken out while passing through the first adsorption heat exchanger (51) flows into the exhaust air passage (33) through the first exhaust air damper (47), passes through the exhaust fan (25), and then is exhausted to the outside (40) through the exhaust opening (21).

On the other hand, the second air which has flown into the outside air passage (34) flows into the second heat exchanger chamber (38) through the second outside air damper (44), and then passes through second adsorption heat exchanger (52). In the second adsorption heat exchanger (52), the adsorbent heated by the refrigerant releases moisture, and water vapour released from the adsorbent is provided to the second air. The second air humidified while passing through the second adsorption heat exchanger (52) flows into the supply air passage (31) through the second supply air damper (46), passes through the air supply fan (26), and then is supplied to the room (30) through the air supply opening (22).

Simple Ventilation Mode

Figure 12:
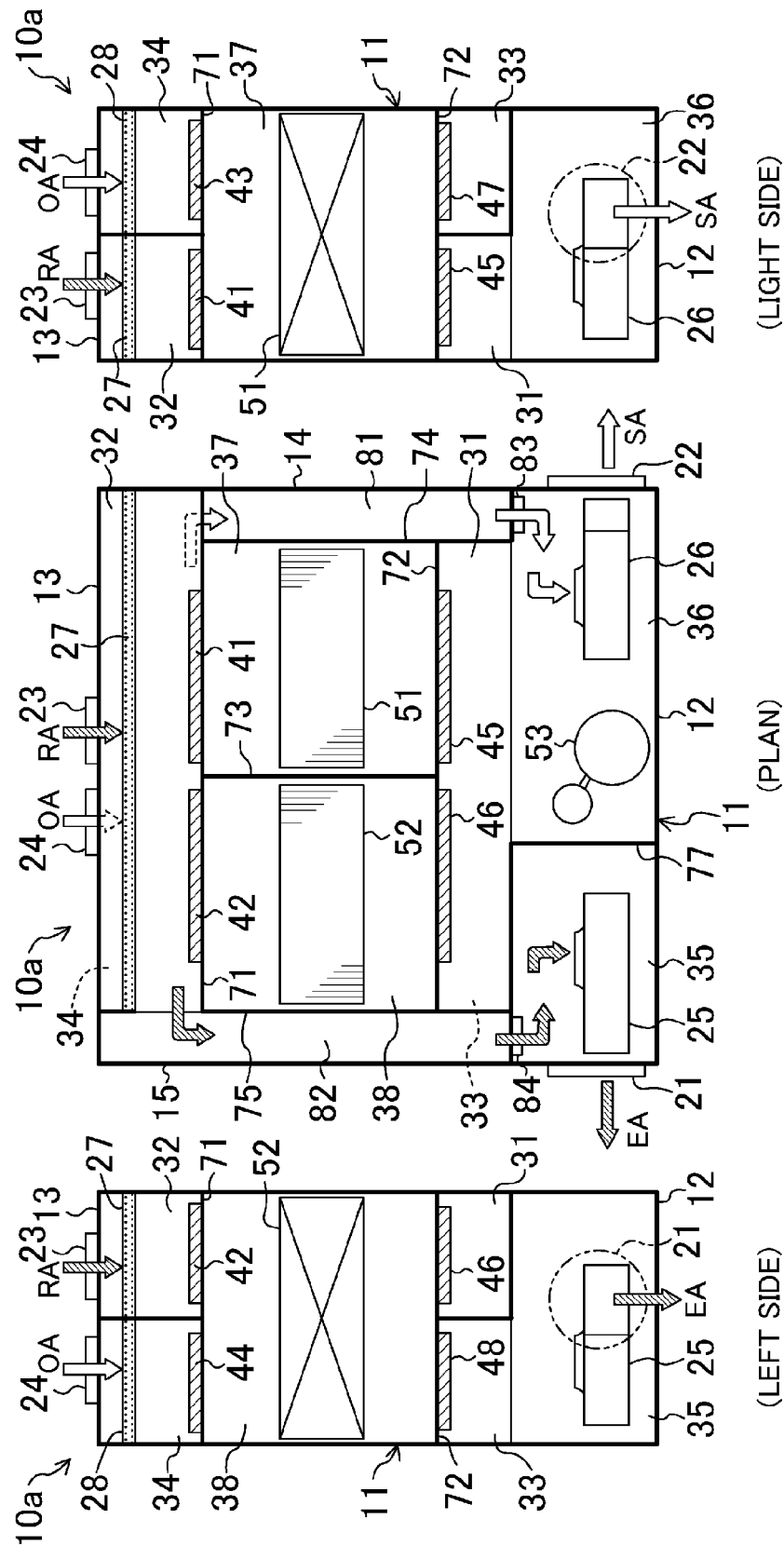
FIG. 12 shows a plan view, a right-side view, and a left-side view of the humidity control device and schematically illustrates an airflow in simple ventilation in the ventilation device of the third embodiment.

Operation of the ventilation device (10a) in the simple ventilation mode will be described with reference to FIG. 12. This simple ventilation mode is performed in a period in which comfort of the room (30) is not impaired even when outside air is supplied to the room (30) without change (e.g., intermediate seasons such as spring and autumn). Specifically, the simple ventilation mode is carried out when humidity control of air to be supplied to the room (30) is not necessary but ventilation of the room (30) is needed.

In the simple ventilation mode, the first bypass damper (83) and the second bypass damper (84) are open, whereas the first room air damper (41), the second room air damper (42), the first outside air damper (43), the second outside air damper (44), the first supply air damper (45), the second supply air damper (46), the first exhaust air damper (47), and the second exhaust air damper (48) are closed. The first bypass damper (83) is open after the air supply fan (26) has been actuated, and is kept in the closed state until the air supply fan (26) is actuated.

During the simple ventilation mode, the compressor (53) of the refrigerant circuit (50) is in the stopped state. That is, during the simple ventilation mode, no refrigeration cycle is performed in the refrigerant circuit (50).

In the ventilation device (10a) in the simple ventilation mode, when the air supply fan (26) operates, outside air is taken in the casing (11) through the outside-air inlet (24). The outside air which has flown into the outside air passage (34) through the outside-air inlet (24), flows into a first bypass passage (81) through an outside air filter (28), and then flows into an air supply fan chamber (36) through the first bypass damper (83). The outside air which has flown into the air supply fan chamber (36) is drawn by the air supply fan (26), and is supplied to the room (30) through the air supply opening (22).

In the ventilation device (10a) in the simple ventilation mode, when the exhaust fan (25) operates, room air is taken in the casing (11) through the room-air inlet (23). The room air which has flown into the room air passage (32) through the room-air inlet (23) flows into a second bypass passage (82) through the room air filter (27), and then flows into an exhaust fan chamber (35) through the second bypass damper (84). The room air which has flown into the exhaust fan chamber (35) is drawn by the exhaust fan (25), and is exhausted to the outside (40) through the exhaust opening (21).

On/Off Control of Damper in Simple Ventilation Mode in Controller

The controller (100) identifies an operation mode required by a user based on information from the control switch, and determines whether actuation of the ventilation device (10a) is requested or not. In a case where the ventilation device (10a) is in the stopped state and the simple ventilation mode is selected as an operation mode, upon a request of actuation of the ventilation device (10a), the controller (100) controls the dampers (41-48, 83, and 84) to the predetermined states described above, and actuates the air supply fan (26), the exhaust fan (25), and the booster fan (1). At this time, the controller (100) keeps the first bypass damper (83) in the closed state from the request of actuation of the ventilation device until the air supply fan (26) is actuated (i.e., until an actuation detection signal is received from the operation sensor (17) of the air supply fan (26)), and keeps the first bypass damper (83) in the open state after the air supply fan (26) has been actuated. Accordingly, an air passage between the booster fan (1) and the air supply fan (26) can be shut off by the first bypass damper (83) until the air supply fan (26) is actuated. In this manner, it is possible to prevent the air supply fan (26) from starting up while running at idle due to an airflow from the booster fan (1). This operation ensures protection of the air supply fan (26) against break-in current occurring at a start-up thereof.

In addition, in this embodiment, the first bypass damper (83) for use in switching operation modes of the ventilation device (10a) is employed as the idle-running prevention mechanism, thereby reducing the cost of the entire apparatus by sharing parts.

Other Embodiments

The configuration of the present disclosure is not limited to the foregoing embodiments, and various changes and modifications may be made.

Specifically, in the foregoing embodiments, the booster fan (1) is placed only upstream in supply air of the air supply fan (26). Alternatively, another booster fan (1) may be added to be placed downstream in exhaust air of the exhaust fan (25).

Figure 15:
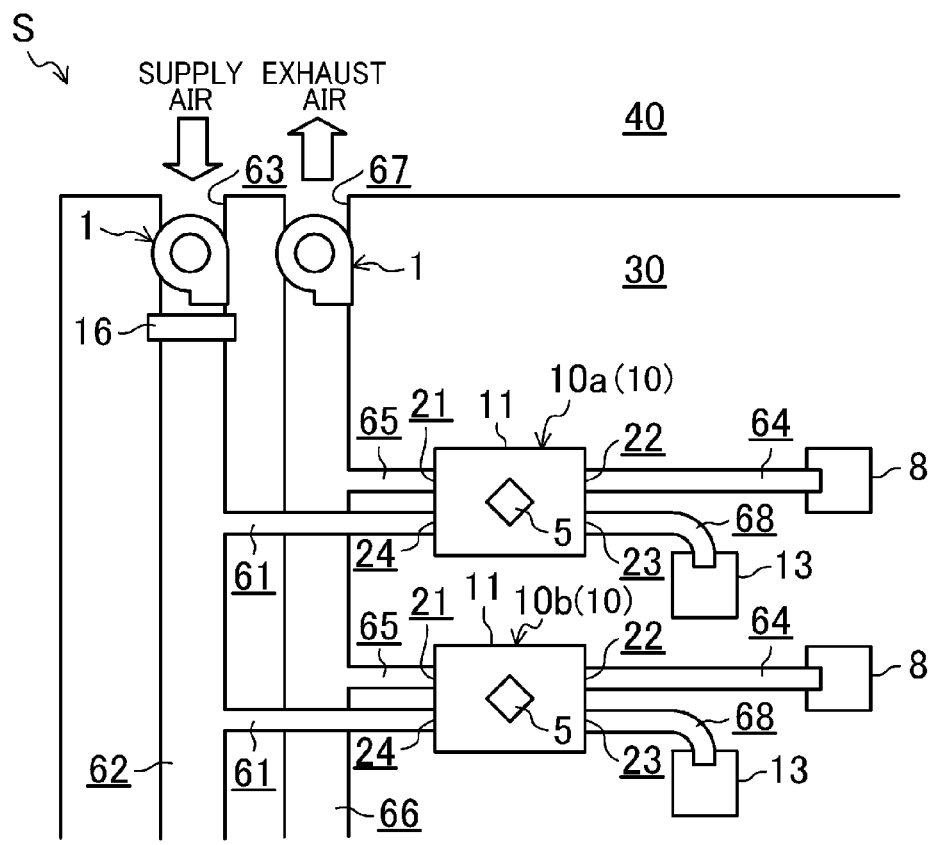
FIG. 15 is a view schematically illustrating a ventilation system according to another embodiment, and corresponding to FIG. 1.

Specifically, as illustrated in FIG. 15, a booster fan (1) for strengthening room-air intake power of the exhaust fan (25) may be placed near the ventilation opening (67) of the common air exhaust passage (66) of the first embodiment. In a manner similar to the control of the booster fan (1) in the common air-supply passage (62) of the first embodiment, the booster fan control unit (102) of the controller (100) controls the booster fan (1) in the common exhaust passage (66). Other configurations, operation, and advantages are the same as those in the first embodiment.

Figure 16:
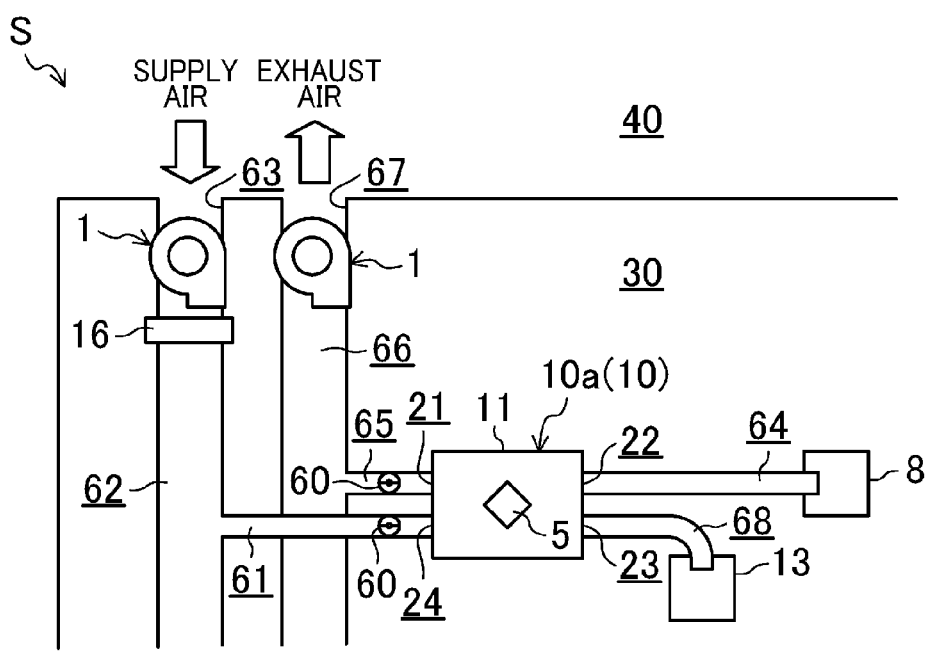
FIG. 16 is a view schematically illustrating a ventilation system according to another embodiment, and corresponding to FIG. 6.

In addition, as illustrated in FIG. 16, a booster fan (1) for strengthening room-air intake power of the exhaust fan (25) may be placed near the ventilation opening (67) of the common air exhaust passage (66) of the second embodiment. The outside exhaust passage (65) may be provided with an open/close damper (60) similar to the damper (60) in the outside air-supply passage (61) to form an idle-running prevention mechanism. In a manner similar to the control of the booster fan (1) in the common air-supply passage (62) of the second embodiment, the booster fan control unit (102) of the controller (100) controls the booster fan (1) in the common exhaust passage (66). In a manner similar to the damper (60) in the outside air-supply passage (61), the damper control unit (103) controls the damper (60) in the outside exhaust passage (65). Other configurations, operation, and advantages are the same as those in the second embodiment.

In the foregoing embodiments, the ventilation device (10) is a so-called first-type ventilation device including the air supply fan (26) and the exhaust fan (25). However, the present disclosure is not limited to this type. For example, the ventilation device (10) may be a second-type ventilation device including, for example, only the air supply fan (26) (i.e., the exhaust fan (25) is omitted in the above embodiments), or may be a third-type ventilation device including only the exhaust fan (25). In a case where the ventilation device (10) is a third-type ventilation device, it is sufficient to place a booster fan (1) upstream or downstream in supply air of the exhaust fan (25). In the controller (100), when a request of actuation of the ventilation device (10) is detected, the booster fan (1) is actuated after the exhaust fan (25) has been actuated. In this manner, it is possible to prevent the exhaust fan (25) from starting up while running at idle due to an airflow from the booster fan (1).

In the foregoing embodiments, the booster fan (1) is placed only upstream in supply air of the air supply fan (26). Alternatively, another air supply fan (26) may be added downstream in exhaust air of the exhaust fan (25).

In the foregoing embodiments, the booster fan (1) is placed upstream in supply air of the air supply fan (26). Alternatively, the booster fan (1) may be placed downstream in supply air of the air supply fan (26).

In the first embodiment, the ventilation system (S) includes two ventilation devices (10). In the second embodiment, the ventilation system (S) includes one ventilation device (10).

However, the present disclosure is not limited to these configurations, and the ventilation system (S) may include three or more ventilation devices (10).

In the foregoing embodiments, the ventilation device (10) is switched between the actuation state and the stopped state by user's manual operation. However, the present disclosure is not limited to this operation, and a $CO_2$ sensor may be provided in the room (30) such that the ventilation device (10) is switched between the actuation state and the stopped state according to the $CO_2$ concentration detected by the $CO_2$ sensor, for example.

In the foregoing embodiments, the salt filter (16) is provided. However, the ventilation system (S) does not need to include the salt filter (16).

INDUSTRIAL APPLICABILITY

The present disclosure is useful for a ventilation system including a ventilation device having a ventilation fan for room ventilation and a booster fan for strengthening ventilation power of the ventilation fan, and particularly useful in the case of providing a salt filter in an air supply passage or an exhaust passage in salt-affected regions, for example.

DESCRIPTION OF REFERENCE CHARACTERS

S ventilation system
1 booster fan
10 ventilation device
25 exhaust fan
26 air supply fan
60 damper
63 ventilation opening (inlet)
67 ventilation opening (outlet)
83 first bypass damper (channel switching mechanism)
100 controller
101 ventilation control unit
102 booster fan control unit
103 damper control unit

The invention claimed is:

1. A ventilation system, comprising:
a ventilation device including a casing having an air supply passage for introducing outside air into a room and an exhaust passage for exhausting room air to an outside, and an air supply fan placed in the air supply passage and configured to be driven by a DC motor, draw outside air, and supply the outside air to the room;
a booster fan placed upstream in supply air of the air supply fan, the booster fan being configured to strengthen outside-air intake power of the air supply fan when the ventilation device is actuated, the booster fan being capable of causing the air supply fan to run at idle if the booster fan is running while the ventilation device is stopped;
a ventilation control unit configured to actuate the air supply fan when actuation of the ventilation device is requested; and
a booster fan control unit configured to prevent the booster fan from causing the air supply fan to run at idle at a time at which the ventilation device is actuated from a stopped state by: stopping the booster fan when the ventilation device is in the stopped state, and upon a request of actuation of the ventilation device in the stopped state, actuating the stopped booster fan after the ventilation control unit has actuated the air supply fan.

2. The ventilation system of claim 1, further comprising:
a damper placed in an air passage between the booster fan and the air supply fan of the ventilation device and configured to open/close the air passage; and
a damper control unit configured to, upon a request of actuation of the ventilation device in the stopped state, keep the damper in a closed state from the request of actuation of the ventilation device until the ventilation control unit actuates the air supply fan of the ventilation device, and switch the damper to an open state after the air supply fan has been actuated.

3. The ventilation system of claim 2, further comprising:
an operation sensor configured to output an actuation detection signal when a rotation speed of the air supply fan is a predetermined rotation speed or more, wherein
upon a request of actuation of the ventilation device in the stopped state, the damper control unit keeps the damper in the closed state from the request of actuation of the ventilation device until the operation sensor outputs the actuation detection signal, and switches the damper to the open state after the output of the actuation detection signal from the operation sensor.

4. The ventilation device of claim 2, wherein
the booster fan is driven by a DC motor, and
the damper control unit keeps the damper in a closed state until the ventilation control unit actuates the air supply fan and the booster fan control unit actuates the booster fan, and switches the damper to an open state after the air supply fan has been actuated and the booster fan has been actuated.

5. A ventilation system, comprising:
a plurality of ventilation devices each including a casing having an air supply passage for introducing outside air into a room and an exhaust passage for exhausting room air to an outside, and an air supply fan placed in the air supply passage and configured to be driven by a DC motor, draw outside air, and supply the outside air to the room;
a booster fan placed upstream in supply air of the air supply fans of the plurality of ventilation devices, the booster fan being configured to strengthen outside-air intake power of each of the air supply fans when the corresponding ventilation device is actuated, the booster fan being capable of causing each of the air supply fans to run at idle if the booster fan is running while the corresponding ventilation device is stopped;
a ventilation control unit configured to actuate the air supply fan of at least one of the ventilation devices whose actuation has been requested; and
a booster fan control unit configured to actuate the booster fan when at least one of the ventilation devices is in an actuation state, wherein
in a case where at least one of the ventilation devices is actuated, upon a request of actuation of another one of the ventilation devices in a stopped state, the booster fan control unit prevents the booster fan from causing the air supply fan of the another one of the ventilation devices to run at idle at a time at which the another one of the ventilation devices is actuated from the stopped state by: temporarily stopping the booster fan before the ventilation control unit actuates the air supply fan of the another one of the ventilation devices from the stopped state, and actuating the stopped booster fan again after the air supply fan of the another one of the ventilation devices has been actuated.

6. A ventilation system, comprising:
a ventilation device including a casing having an air supply passage for introducing outside air into a room and an exhaust passage for exhausting room air to an outside, and an exhaust fan placed in the exhaust passage and configured to be driven by a DC motor, draw room air, and exhaust the room air to the outside;
a booster fan placed downstream in exhaust air of the exhaust fan, the booster fan being configured to strengthen room-air intake power of the exhaust fan when the ventilation device is actuated, the booster fan being capable of causing the exhaust fan to run at idle if the booster fan is running while the ventilation device is stopped;
a ventilation control unit configured to actuate the exhaust fan upon a request of actuation of the ventilation device; and
a booster fan control unit configured to prevent the booster fan from causing the exhaust fan to run at idle at a time at which the ventilation device is actuated from a stopped state by: stopping the booster fan when the ventilation device is in the stopped state, and upon a request of actuation of the ventilation device in the stopped state, actuating the stopped booster fan after the ventilation control unit has actuated the exhaust fan.

7. The ventilation system of claim 6, further comprising:
a damper placed in an air passage between the booster fan and the exhaust fan of the ventilation device and configured to open/close the air passage; and
a damper control unit configured to, upon a request of actuation of the ventilation device in the stopped state, keep the damper in a closed state from the request of actuation of the ventilation device until the ventilation control unit actuates the exhaust fan of the ventilation device, and switch the damper to an open state after the exhaust fan has been actuated.

8. The ventilation system of claim 2 or 7, wherein
the ventilation device includes a channel switching mechanism configured to perform switching between a humidity control ventilation mode in which ventilation is performed with room air subjected to humidity control and a simple ventilation mode in which ventilation is performed with air in the room subjected to no humidity control, and
the damper forms the channel switching mechanism.

9. A ventilation system, comprising:
a plurality of ventilation devices each including a casing having an air supply passage for introducing outside air into a room and an exhaust passage for exhausting room air to an outside, and an exhaust fan placed in the exhaust passage and configured to be driven by a DC motor, draw room air, and exhaust the room air to the outside;
a booster fan placed downstream in exhaust air of the exhaust fans of the plurality of ventilation devices, the booster fan being configured to strengthen room-air intake power of each of the exhaust fans when the corresponding ventilation device is actuated, the booster fan being capable of causing each of the exhaust fans to run at idle if the booster fan is running while the corresponding ventilation device is stopped;
a ventilation control unit configured to actuate the exhaust fan of at least one of the ventilation devices whose actuation has been requested; and
a booster fan control unit configured to actuate the booster fan when at least one of the ventilation devices is in an actuation state, wherein
in a case where at least one of the ventilation devices is actuated, upon a request of actuation of another one of the ventilation devices in a stopped state, the booster fan control unit prevents the booster fan from causing the exhaust fan of the another one of the ventilation devices to run at idle at a time at which the another one of the ventilation devices is actuated from the stopped state by: temporarily stopping the booster fan before the ventilation control unit actuates the exhaust fan of the another one of the ventilation devices from the stopped state, and actuating the stopped booster fan again after the exhaust fan of the another one of the ventilation devices has been actuated.

* * * * *